United States Patent
Wade et al.

(10) Patent No.: US 9,659,013 B2
(45) Date of Patent: *May 23, 2017

(54) SYSTEM AND METHOD FOR INDEXING ELECTRONIC DISCOVERY DATA

(71) Applicant: PLANET DATA SOLUTIONS, Elmsford, NY (US)

(72) Inventors: Michael Wade, Parker, CO (US); Robert Nelson, Franktown, CO (US)

(73) Assignee: PLANET DATA SOLUTIONS, Elmsford, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/533,015

(22) Filed: Nov. 4, 2014

(65) Prior Publication Data
US 2015/0055867 A1   Feb. 26, 2015

Related U.S. Application Data

(63) Continuation of application No. 13/267,800, filed on Oct. 6, 2011, now Pat. No. 8,924,395.

(60) Provisional application No. 61/530,212, filed on Sep. 1, 2011, provisional application No. 61/390,221, filed on Oct. 6, 2010.

(51) Int. Cl.
*G06F 17/30* (2006.01)
*G06Q 50/18* (2012.01)
*G06K 9/18* (2006.01)

(52) U.S. Cl.
CPC .. *G06F 17/30011* (2013.01); *G06F 17/30312* (2013.01); *G06K 9/18* (2013.01); *G06Q 50/184* (2013.01)

(58) Field of Classification Search
USPC .................................................. 707/741, 740
See application file for complete search history.

(56) References Cited

U.S. PATENT DOCUMENTS

| | | | |
|---|---|---|---|
| 2006/0095890 A1* | 5/2006 | Reeves | H04Q 3/0054 717/100 |
| 2008/0065842 A1* | 3/2008 | Dahlstedt | G06F 12/0253 711/159 |
| 2008/0086457 A1* | 4/2008 | Fei | G06F 17/30864 |
| 2009/0265609 A1* | 10/2009 | Rangan | G06F 17/30011 715/234 |
| 2010/0057763 A1* | 3/2010 | Smith | G06F 17/30011 707/E17.044 |
| 2011/0320933 A1* | 12/2011 | Sanami | G06F 17/248 715/246 |
| 2012/0041955 A1* | 2/2012 | Regev | G06F 17/3071 707/740 |
| 2012/0054595 A1* | 3/2012 | Mylroie | G06F 17/2247 715/234 |

* cited by examiner

Primary Examiner — Hosain Alam
Assistant Examiner — Ahmed Abraham
(74) Attorney, Agent, or Firm — Leason Ellis LLP

(57) ABSTRACT

Systems and methods for efficiently processing electronically stored information (ESI) are described. The systems and methods describe processing ESI in preparation for, or association with, litigation. The invention preserves the contextual relationships among documents when processing and indexing data, allowing for increased precision and recall during data analytics.

10 Claims, 14 Drawing Sheets

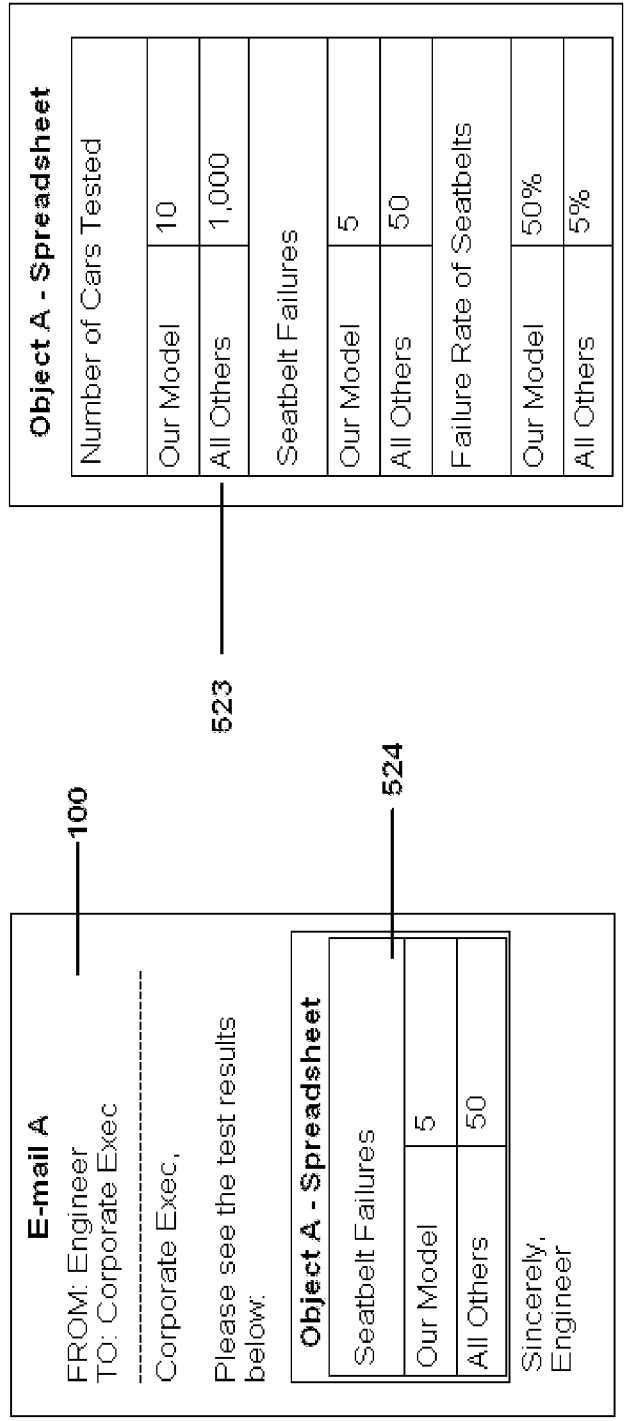

FIG. 6C

E-mail A — 100

FROM: Engineer
TO: Corporate Exec

Corporate Exec,

Please see the test results below:

Object A - Spreadsheet — 524

| Seatbelt Failures | |
|---|---|
| Our Model | 5 |
| All Others | 50 |

Sincerely,
Engineer

Object A - Spreadsheet — 523

| Number of Cars Tested | |
|---|---|
| Our Model | 10 |
| All Others | 1,000 |
| Seatbelt Failures | |
| Our Model | 5 |
| All Others | 50 |
| Failure Rate of Seatbelts | |
| Our Model | 50% |
| All Others | 5% |

Prior Version of Object A — 521

| Number of Cars Tested | |
|---|---|
| Our Model | 1,000 |
| All Others | 1,000 |
| Seatbelt Failures | |
| Our Model | 5 |
| All Others | 50 |
| Failure Rate of Seatbelts | |
| Our Model | 0.5% |
| All Others | 5% |

FIG. 9

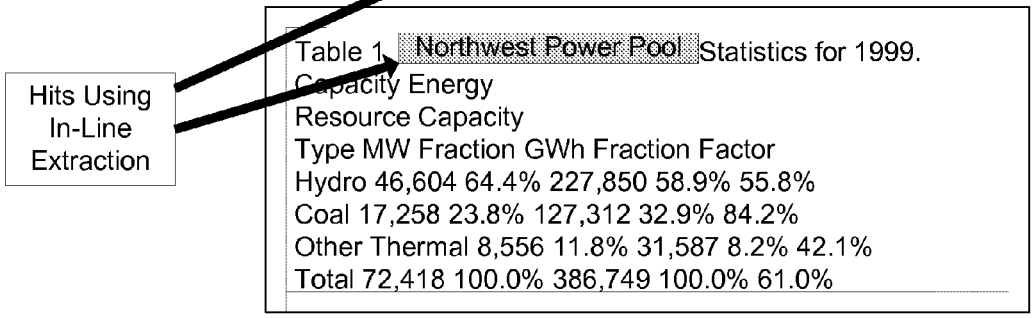

Reciprocal operation can also be achieved by purchases and sales. BC Hydro has a very large storage capacity between its combined holdings on the Columbia and the Peace River. Their pattern of trade is to buy energy whenever they judge the price to be attractive. They use such purchased energy to meet their immediate needs and save water they would have otherwise used to generate and serve load. The effect is that they are buying less expensive energy to store. Later when prices rise, the stored energy is used to serve load and to make sales to other parties. Reciprocal hydro-thermal operation is thus achieved through the marketplace.

The marketplace integration of thermal systems with the hydroelectric capability of the PNW affects the market in all of the Western Interconnection. Figure 9 shows the hourly flows on the Pacific DC Intertie (PDCI) for June of 2000. The daily swings of energy to and from California can be seen in the actual flows on the PDCI. The daily cycle has a range of 2000 to 3000 MW from on-peak to off-peak flow, with PNW exports as high as 2500 MW and PNW imports as high as 1800 MW. The average hourly transfer is a 485 MW export to California, with an average exchange of about 2200 MW. In some months the effect is less pronounced, but even in heavy run-off months, there is still a pronounced daily cycle like that shown.

The result of the combined hydro-thermal operation can be seen in Table 1 above. The limitation on energy production can be seen in the low capacity facotor for hydro units (56%) compared to the high capacity factor for the coal fired units (84%). These two sources together generate 92% of the energy produced in the GPNW. This production also includes a substantial export. Total load for 1999 was 342,897 GWh with an export of 43,852 GWh. While coal represents only a quarter of installed capacity it is responsible for a third of the energy produced. The hydro energy figures vary from year to year depending upon water conditions. The 1999 water year was much better than the two, which followed with 85% and 75%(estimated) of the 1999 figure being produced in 2000 and 2001 respectively.

FIG. 10

> Exego Document Viewer
> Name: Hydro-Thermal.doc

> Text From Embedded Object Is Missing

Reciprocal operation can also be achieved by purchases and sales. BC Hydro has a very large storage capacity between its combined holdings on the Columbia and the Peace River. Their pattern of trade is to buy energy whenever they judge the price to be attractive. They use such purchased energy to meet their immediate needs and save water they would have otherwise used to generate and serve load. The effect is that they are buying less expensive energy to store. Later when prices rise, the stored energy is used to serve load and to make sales to other parties. Reciprocal hydro-thermal operation is thus achieved through the marketplace.

> The marketplace integration of thermal systems with the hydroelectric capability of the PNW affects the market in all of the Western Interconnection. Figure 9 shows the hourly flows on the Pacific DC Intertie (PDCI) for June of 2000. The daily swings of energy to and from California can be seen in the actual flows on the PDCI. The daily cycle has a range of 2000 to 3000 MW from on-peak to off-peak flow, with PNW exports as high as 2500 MW and PNW imports as high as 1800 MW. The average hourly transfer is a 485 MW export to California, with an average exchange of about 2200 MW. In some months the effect is less pronounced, but even in heavy run-off months, there is still a pronounced daily cycle like that shown.
>
> The result of the combined hydro-thermal operation can be seen in Table 1 above. The limitation on energy production can be seen in the low capacity facotor for hydro units (56%) compared to the high capacity factor for the coal fired units (84%). These two sources together generate 92% of the energy produced in the GPNW. This production also includes a substantial export. Total load for 1999 was 342,897 GWh with an export of 43,852 GWh. While coal represents only a quarter of installed capacity it is responsible for a third of the energy produced. The hydro energy figures vary from year to year depending upon water conditions. The 1999 water year was much better than the two, which followed with 85% and 75%(estimated) of the 1999 figure being produced in 2000 and 2001 respectively.

Unit Commitment

Given its resource mix and operating pattern, the classic unit commitment model is a poor fit to the needs of the GPNW. The large hydro capacity provides a degree of operational flexibility that seldom exists elsewhere. Units as large as the 750 MW generators at Grand Coulee can be synchronized and brought to full load in as little as five minutes. The role of peaking combustion turbines is more likely to address transmission limitations on delivery than to address an inability to meet peak load. To achieve the high capacity factors shown in Table 1, the base load coal plants are only off-line for maintenance or forced outages leaving the hydro system to provide both energy and load shaping.

FIG. 11

Exego Document Viewer
Name: Hydro-Thermal.doc

Reciprocal operation can also be achieved by purchases and sales. BC Hydro has a very large storage capacity between its combined holdings on the Columbia and the Peace River. Their pattern of trade is to buy energy whenever they judge the price to be attractive. They use such purchased energy to meet their immediate needs and save water they would have otherwise used to generate and serve load. The effect is that they are buying less expensive energy to store. Later when prices rise, the stored energy is used to serve load and to make sales to other parties. Reciprocal hydro thermal operation is thus achieved through the marketplace.

The marketplace integration of thermal systems with the hydroelectric capability of the PNW affects the market in all of the Western Interconnection. Figure 9 shows the hourly flows on the Pacific DC Intertie (PDCI) for June of 2000. The daily swings of energy to and from California can be seen in the actual flows on the PDCI. The daily cycle has a range of 2000 to 3000 MW from on-peak to off-peak flow, with PNW exports as high as 2500 MW and PNW imports as high as 1800 MW. The average hourly transfer is a 485 MW export to California, with an average exchange of about 2200 MW. In some months the effect is less pronounced, but even in heavy run-off months, there is still a pronounced daily cycle like that shown.

Table 1. Northwest Power Pool Statistics for 1999.
Capacity Energy
Resource Capacity
Type MW Fraction GWh Fraction Factor
Hydro 46,604 64.4% 227,850 58.9% 55.8%
Coal 17,258 23.8% 127,312 32.9% 84.2%
Other Thermal 8,556 11.8% 31,587 8.2% 42.1%
Total 72,418 100.0% 386,749 100.0% 61.0%

The result of the combined hydro-thermal operation can be seen in Table 1 above. The limitation on energy production can be seen in the low capacity facotor for hydro units (56%) compared to the high capacity factor for the coal fired units (84%). These two sources together generate 92% of the energy produced in the GPNW. This production also includes a substantial export. Total load for 1999 was 342,897 GWh with an export of 43,852 GWh. While coal represents only a quarter of installed capacity it is responsible for a third of the energy produced. The hydro energy figures vary from year to year depending upon water conditions. The 1999 water year was much better than the two, which followed with 85% and 75%(estimated) of the 1999 figure being produced in 2000 and 2001 respectively.

SYSTEM AND METHOD FOR INDEXING ELECTRONIC DISCOVERY DATA

CROSS REFERENCE TO RELATED APPLICATIONS

This application is a continuation of U.S. application Ser. No. 13/267,800, filed Oct. 6, 2011, which claims priority to Provisional Application No. 61/390,221 filed on Oct. 6, 2010, and Provisional Application No. 61/530,212, filed on Sep. 1, 2011, the contents of which are hereby incorporated by reference in their entireties herein.

FIELD OF INVENTION

The present invention relates to the field of processing data; more particularly, the retrieval, processing, organization and analysis of electronically stored information.

BACKGROUND OF THE INVENTION

As part of legal discovery, the parties to a lawsuit must produce huge volumes information. See Fed. R. Civ. P. 45(d) (requiring production of documents in response to a subpoena). Document review is a crucial, time-consuming part of litigation and is increasingly becoming the most expensive part of the litigation process. KIKER, Dennis R. 'How to Manage ESI to Rein In Runaway Costs'. In Law.com, Corporate Counsel [online]. Jul. 18, 2011 [retrieved on 2011-10-06]. Retrieved from the Internet: <URL:http://law-.com/jsp/cc/PubArticleCC.jsp?id=1202503308698&src=EMC-Email&et=editoral&bu=Corporate%20Counsel&pt=Corporate%20Counsel%20In-House%20Tech%20Alert&cn=In_House_Tech_20110719&kw=How%20to%20Manage%20ESI%20to%20Rein%20In%20Runaway%20Costs>. Each party typically makes broad requests for its opponent to produce documents it believes will contain information relevant to its claims and defenses. The rapid escalation of the amount of electronically stored information ("ESI") being stored and transmitted electronically creates numerous issues such as problems with storage, searching, recall, precision, etc. CORTESE, Alfred W., Jr. 'Skyrocketing Electronic Discovery Costs Require New Rules'. In ALEC (American Legislative Exchange Council) Policy Forum [online]. March 2009 [retrieved on 2011-10-06]. Retrieved from the Internet: <URL:http://www.a-lec.org/am/pdf/apf/electronicdiscovery.pdf>. Although computers can handle the bulk of the searching chores, significant human involvement remains necessary. As a result, the cost of discovery is often very high and increasing. Id.

Because of the high cost involved in any legal proceeding involving ESI, which represents the majority all civil and criminal litigations, see PASSARELLA, Gina, "E-Discovery Evolution': Costs of Electronic Discovery Are Growing', In post-gazette.com (Pittsburgh Post-Gazette) [online], Aug. 15, 2011 [retrieved on 2011-10-06], Retrieved from the Internet: <URL:http:post-gazette.com/pg/11227/1166927-499-0.stm>, litigants are more likely to engage in Early Case Assessment ("ECA"). ECA allows the litigants to determine what is contained in their ESI before a broader substantive review takes place. SILVA, Oliver, 'Early Case Assessment (ECA)—Incorporating ECA into Your Discovery Strategy'. In e-LegalTechnology.org [online]. 2010 [retrieved on 2011-10-06]. Retrieved from the Internet: <URL:http://www.e-legaltechnology.org/member-articles/article-detail-.php?id=39>. This is particularly important in determining whether to bring, or how to defend against, potential litigation, all while minimizing costly human review.

The currently available ECA processing tools reflect a traditional, almost paper-based, approach to document reproduction. In a typical paper filing cabinet, all documents may be organized into sequential or linear files based on a particular methodology. If a user is looking for a particular document, the user may find the relevant file and then be required to look through each document in a sequential order in order to find the particular document. Typical ECA processing tools use the same conceptual approach, i.e., a sequential or linear methodology for reproducing and retrieving electronic information.

For example, an email database represents a paper filing cabinet. Each email represents a file, and any documents attached to that email ("attachments") would be included in the file. The ECA processing tool stores each email as a record and reproduces the email text and any attachments in a sequential order, the same as it would do for paper files.

Unfortunately, electronic messages are no longer confined to such linear or sequential methods of storage. Individual electronic documents may not only be stored after other electronic documents, but embedded within, and linked to, other electronic documents through Object Linking and Embedding ("OLE"), which is a technology developed by Microsoft® that allows embedding and linking to documents and other objects.

Not only must every email or document be reviewed, but the context and relationship of that document must also be preserved. Without knowing the context in which the document was created, its entire meaning is often lost. Even the context of the information within the documents must be carefully preserved so that advanced semantic and linguistic analytical tools can properly evaluate and compare concepts between documents accurately. Therefore, any proper retrieval of a document requires the precise and accurate retrieval of the information in the document and the information about the document. Thus, there exists a growing need to develop methods and systems that can organize and search data in a way that preserves the context of the information and permits review of embedded objects while still maintaining the textual (or substantive), as well as conceptual, information in the proper context.

The present invention provides such a method and system for extracting information or data from documents containing multiple embedded objects. The method and system preserves the overall relationships among documents their embedded objects and allows for rapid and efficient data extraction and analysis for large quantities of data, i.e. terabytes to petabytes.

SUMMARY OF THE INVENTION

The invention provides a method for indexing one or more documents, $d_i$, and comprises the steps of (a) determining a file type, $f_i$, of each of the one or more documents, $d_i$; (b) performing an extraction, $e_i$, of data, $da_i$, from the one or more documents, $d_i$; (c) testing the data, $da_i$, recovered from the extraction, $e_i$, of document, $d_i$, for one or more embedded objects, $d_k$, and if one or more embedded objects, $d_k$, are detected, appending data, $da_i$, from the one or more embedded objects, $d_k$, to a buffer where the data is present in the one or more documents, $d_i$, and (d) repeating steps (a) to (c) recursively for the one or more documents, $d_i$, until no additional embedded objects, $d_k$, are detected in the one or more documents, $d_i$; where (1) the data $da_i$, is visually represented in the one or more documents, $d_i$; (2) the data, $da_i$, comprises text, visual information, or graphical information; (3) the embedded objects, $d_k$, contain additional embedded documents $d_{k+n}$, where n is an integer from 1 to n representing a number of levels, 1, of objects embedded successively in $d_k$; and (4) the file type of the one or more documents, $d_i$, is identifiable by a file typer; and further comprises generating an index, i, where the index represents at least one set of relationships among the documents, $d_i$, and the embedded objects, $d_k$, and where the documents, $d_i$, and the embedded objects, $d_k$, have at least one individual identifier, $id_i$ or $id_k$, associated with each of the documents, $d_i$, and the embedded objects, $d_k$; text, $t_k$, of a visual representation of $d_k$ within $d_i$ is preserved both in substance and location with respect to text in document $d_i$; and for every file type, $f_i$, there is an individual, corresponding extraction, $e_i$.

The method described above further comprises repeating steps (a) through (d) recursively for all the embedded objects, $d_k$, and if at least one additional embedded object is detected in $d_k$, performing an extraction of the additional embedded objects until no additional embedded objects are detected in $d_k$; and where documents are embedded with a hierarchical relationship represented by $d_k$ embedded in $d_i$, $d_{k+1}$ embedded in $d_k$, $d_{k+2}$ embedded in $d_{k+1}$, to $d_{k+n}$ embedded in $d_{k+(n-1)}$.

The present invention also provides for a computer system for reviewing data. The computer system comprises: (a) a source of a plurality of electronic documents; (b) a file ripper for extracting data from at least one document, $d_i$, from the plurality of electronic documents; (i) where the file ripper tests each document, $d_i$, for linked or embedded objects, $d_k$; (ii) where the file ripper recursively repeats step (i) if additional linked or embedded objects, $d_k$, are detected; and (c) an index, i, which comprises data from the documents and objects, $d_i$ and $d_k$, where the index preserves hierarchical relationships among $d_i$ and $d_k$; $d_i$ and $d_k$ each have at least one individual identifier; and a visual representation of $d_k$ within $d_i$ is preserved through the use of an object map, m; where the index is stored in a buffer on a computer-readable storage medium capable of receiving requests for specific data characteristics and identifying documents, $d_k$, or embedded objects, $d_k$, with those characteristics; and further comprises a library housing methods of extraction, $e_i$, for all file types, $f_i$ and $f_k$, respectively for documents and objects $d_i$ and $d_k$; where (1) the computer system is used for preparation of documents which are to be reviewed in connection with a litigation; (2) the computer system is located within a plurality of servers, processors and storage media in communication over a network; (3) the computer system comprises a terminal for accepting user input or displaying data processed by a computer-readable storage medium; (4) the source of a plurality of electronic documents is in communication with other components of the computer system via the Internet; (5) each document $d_i$ is selected from the group consisting of a text file, an image, and a spreadsheet; and (6) each embedded object $d_k$ is selected from the group consisting of a text file, an image, and a spreadsheet; and further comprises a first processor capable of receiving at least one document, $d_i$, extracting data from said document, and recursively searching said document for linked or embedded objects.

The computer system described above further comprises (1) a first computer-readable storage medium capable of containing all extracted data and featuring a buffer with data for each linked or embedded object indexed separately, where each of a substance, location and textual relationship of each linked or embedded object and the document $d_i$ is preserved; (2) a second processor in communication with the computer-readable storage medium capable of receiving requests for specific data characteristics and identifying the documents, $d_i$, or embedded objects with those characteristics; and (3) a second computer-readable storage medium containing a library of all individual programs for all file types; where the second computer-readable storage medium is in communication with the processor; the computer system is used for the preparation of documents in anticipation of litigation; the computer system is located within a plurality of servers, processors and computer-readable storage media in communication over a network; the computer system comprises a terminal for accepting user input or displaying extracted data processed by the first and second computer-readable storage media; and the source of a plurality of electronic documents is in communication with other components of the computer system via the Internet.

BRIEF DESCRIPTION OF DRAWINGS

Illustrative embodiments of the present invention are described below with reference to the attached drawings, which are incorporated by reference herein.

FIG. 6B is a block diagram representing the results of a search query of documents processed by the systems and methods of one embodiment of the invention.

FIG. 6C is a block diagram representing the results of a search query of documents processed by the systems and methods of one embodiment of the invention.

FIG. 9 is a representation of in-line text extracted from within a Microsoft® Word® document using the systems and methods of the invention.

FIG. 10 is a representation of the same Microsoft® Word® document described in FIG. 9 as processed by a third-party application.

FIG. 11 is a representation illustrating one result of a trial search employing the systems and methods of the invention.

DETAILED DESCRIPTION OF THE INVENTION

Figure 1A:
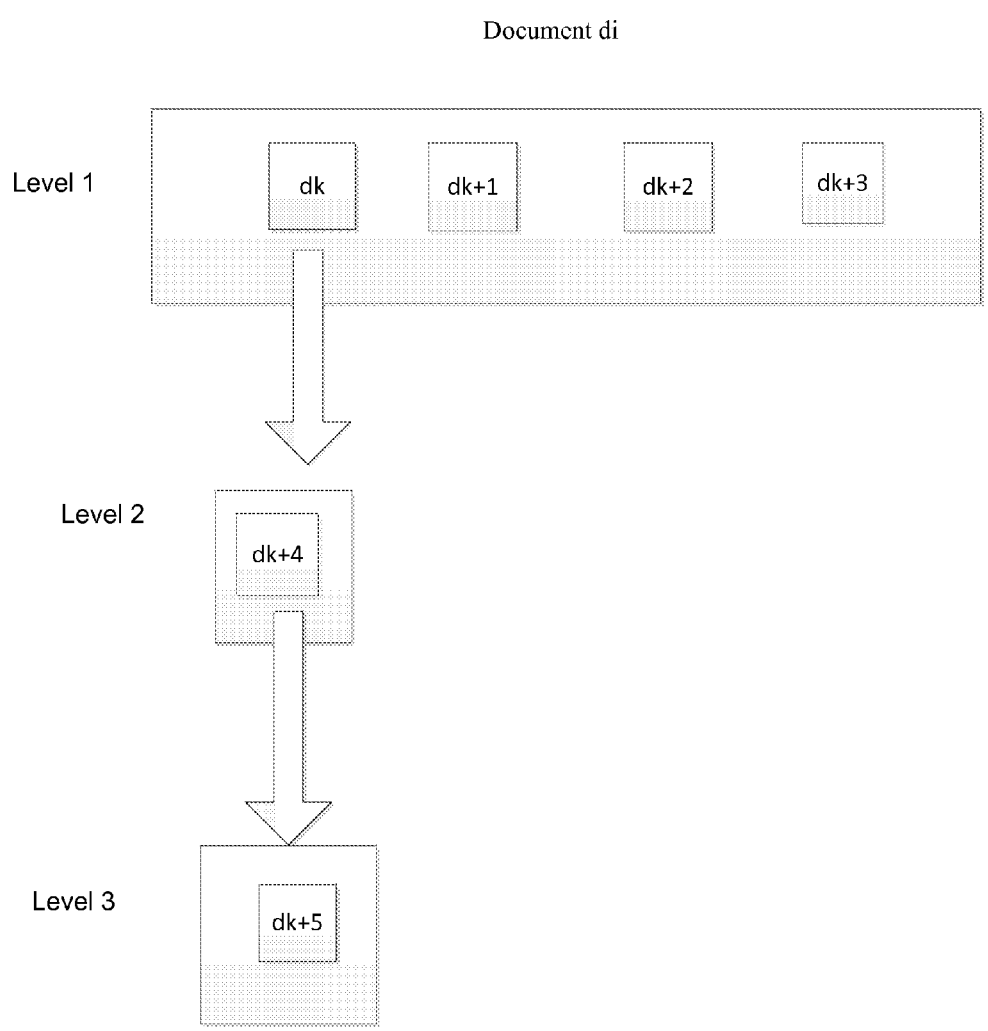
FIG. 1A illustrates multiple levels of embedding of objects within a document.

The present invention relates to systems and methods for efficiently retrieving, processing and analyzing data, including in preparation for, or in association with, litigation. The use of the systems and methods of the present invention allows electronic information associated with native file documents to be preserved, while simultaneously allowing the documents to be viewed, manipulated, searched and processed with increased precision and recall. See http://en.wikipedia.org/wiki/Precision_and_recall [retrieved on 2011-10-06].

Early Case Assessment ("ECA") typically begins by preserving and gathering all relevant ESI. The potentially relevant data is then processed using an ECA processing tool for purposes of filtering, searching or performing data analytics.

"Processing" refers to the use of a computer system, or equivalent electronic device, to manipulate and transform data currently in the computer system's internal or external memory into another form of data, which can be stored in or exported from the computer system. ECA typically involves obtaining ESI in its native form, which can include numerous different types of file formats. The native data may also be encrypted or otherwise protected. It is thus necessary for an electronic discovery tool to be capable of handling multiple, different types of file formats. See BUCKLES, Greg. 'The Devil is in the Details—Processing Pitfalls'. In eDiscovery Journal [online]. Apr. 29, 2010 [retrieved on 2011-10-06]. Retrieved from the Internet: <URL:http://ediscoveryjournal.com/2010/04/the-devil-is-in-the-details-%e2%80%93-processing-pitfalls>. Furthermore, because an electronic discovery tool must be capable of processing a multitude of different file formats, it should be adept at handling exceptions as it processes ESI, enabling users to know which files it could not process successfully. If this information is not recorded and communicated accurately, users may be unaware that particular files have not been processed and may therefore be unable to take further action to ensure that the information in these files is retrieved, processed, analyzed in preparation for possible production in a litigation. Id.

Processing can also involve "culling" and/or "de-duplicating" as well as finding "near duplicates" of documents. BURNEY, Brett, 'Dispelling Doubts About De-Duplication'. In InsideCounsel [online]. Jul. 17, 2008 [retrieved on 2011-10-06]. Retrieved from the Internet: <URL:http://www.insidecounsel.com/2008/07/17/dispelling-doubts-about-deduplication>. Culling involves the removal of documents from the search database based on a set of parameters such as a date range or other metadata (Custodian, File Type, Original Location, etc.). De-duplication produces one instance of an item when multiple copies exist. The process is usually based on a hash value of the entire document. Id. Near de-duplication is usually based upon a combination of matching information at a finer level of granulation (multiple levels within a document rather than against the entire document), and applies concept-based comparisons of documents. MURPHY, Barry. 'Content Analytics—The Heart of ECA'. In eDiscovery Journal [online]. Mar. 3, 2011 [retrieved on 2011-10-06]. Retrieved from the Internet: <URL:http://ediscoveryjournal.com/2011/03/content-analytics-the-heart-of-eca/>.

Computer hashing refers to a family of algorithms, such as SHA-1 and MD5, which form the mathematical foundation of electronic discovery, or "e-discovery." LOSEY, Ralph. 'Hash'. In e-Discovery Team [online]. [retrieved on 2011-10-06]. Retrieved from the Internet: <URL:http://e-discoveryteam.com/computer-hash-5f0266c4c326b9a1ef9e39cb78c352dc/>. Hashing generates a unique alphanumeric value, or "hash value," to identify a particular computer file, group of files, or even an entire hard drive. Id. The hash value acts as a digital fingerprint guaranteeing the authenticity of data, and protects it against alteration, either negligent or intentional. Id.

The processed data may be indexed to optimize speed and performance in finding relevant documents using a search query or text data mining. See SMITH, Chris. 'Introduction to Database Indexes'. In Interspire [online]. Feb. 15, 2006 [retrieved on 2011-10-06]. Retrieved from the Internet: <URL:http://www.interspire.com/content/2006/02/15/introduction-to-database-indexes>. Without an index, in order to search the relevant database, each record has to be examined individually. This type of analysis requires considerable time and computing power. Id. When properly indexed, the search can be directed to the relevant records without examining the entire database. For example, while an index of 10,000 documents can be queried within milliseconds, a sequential scan of every word in 10,000 large documents would take far longer. The additional computer storage required to store the index, as well as the considerable increase in the time required for updates to take place, are traded-off for the time saved during information retrieval. Id.

ESI invariably contains not only text, visual and graphic data, but data describing the data itself, called metadata. Discovery of ESI often requires the collection, processing and analysis of both these types of data. See WESCOTT, W. Lawrence II, 'The Increasing Importance of Metadata in Electronic Discovery', 14 RICH. J. L. & TECH. 10 [online] [retrieved on 2011-10-06]. Retrieved from the Internet: <URL:http://law.richmond.edu/jolt/v14i3/article10.pdf>.

Using data in its native format may present technical challenges such as an inability to redact, tag or label documents without modifying their metadata. MACK, Mary. 'Native File Review: Simplifying Electronic Discovery?'. In Legal Tech Newsletter [online]. Dec. 1, 2005 [retrieved on 2011-10-06]. Retrieved from the Internet: <URL:http://www.fios-inc.com/e-discovery-knowledge-center/electronic-discovery-article.aspx?id=306>. Therefore, data is typically converted from its native format such as a Microsoft® Word® ".doc" to a useable format such as a Tagged Image File Format or "TIFF." To preserve and extract the different forms of metadata, current ECA processing tools use "file rippers" based on a set of a pre-defined file types. The pre-defined file types are required for the ECA processing; therefore, if an ECA processing tool does not reliably recognize a file type, the object will either not be processed at all or not be processed correctly.

OLE (and similar technologies such as are found in Open Office and Java Objects) allows an editor to "farm out" part of a document to another editor and then re-import it. For example, a desktop publishing system might send some text to a word processor, or a picture to a bitmap editor, using OLE. The main benefit of using OLE is to display visualizations of data from other programs that the host program is not normally able to generate itself (e.g., a pie-chart in a text document), as well as to create a master file. Particular information can be referenced from a master file. If the master file is changed, the particular information, or visualization of data will also be changed without having to manually edit the document containing the reference. In another example, a document created using Microsoft® Word® might contain a Microsoft® Excel® spreadsheet linked therein. Even though the entire Excel® spreadsheet may be linked within the Word® document, only a select portion of the spreadsheet may be viewable (e.g., the visual representation or window) to a user. Most current ECA processing tools would recognize that there is an embedded Excel® spreadsheet, but the program would extract the entire text of the embedded Excel® document and place it as a separate record or at the end of the parent document. The context of the text in that document is lost, and the text does not represent the data that a reader would have seen when viewing the parent document.

The loss of the contextual relationship between the document and the embedded spreadsheet could cause misleading results when searching (concept, phrase and/or proximity searching). See 'ACC: Why OLE Objects Cause Databases to Grow'. In Microsoft® Support [online]. Jan. 19, 2007 [retrieved on 2011-10-06]. Retrieved from the Internet: <URL:http://supportmicrosoft.com/kb/123151>; BUCK-LES, Greg. 'Proximity Search Challenges in E-Discovery'. In eDiscovery Journal [online]. Jan. 10, 2011 [retrieved on 2011-10-06]. Retrieved from the Internet: <URL:http://ediscoveryjournal.com/2011/01/proximity-search-challenges-in-edisovery/>.

Consequently, data analytics such as proximity searching and concept clustering are often ineffective or work with significantly reduced effectiveness as to the text of the document immediately surrounding the text of the visual representation of the spreadsheet. For Concept related technologies such as Latent Semantic Indexing (LSI), the positional information of words as well as the total number of words and concepts that are present in a given document (as well as the total population of documents) can affect the "relevance" ranking of the results. "In-line" text extraction combined with the use of a visual representation (viewport) reduces the potential number of concepts within a document, which keeps the signal to noise ratio better in most cases and preserves the physical relationships for concept-based algorithms which use concepts as a measure. In this way, the analysis of text for concepts and proximity searches approximates what a human user sees when he or she is reading the actual native document.

In cases where there is only a link to external data within a document, the context of how that data changed over time could also be misleading. For example, successive alterations to an underlying object linked to the document also creates successive alterations to the visual representation of the document viewed by a user at any given time. Moreover, because document collections are from a specific point in time, the documents collected may not represent what the original reader/user of the documents and data therein would have seen at a particular point in time. Identification and extraction of metadata for all objects contained within a document is therefore crucial. Inability to properly record, retrieve, process or analyze this information could lead to spoliation of evidence in a lawsuit. See *Stanley, Inc. v. Creative Pipe, Inc.*, 269 F.R.D. 497 (D. Md. 2010).

Traditional ECA processing tools are designed to quickly index data, so that the data can be searched and reviewed by human reviewers. These systems process and index data in a linear or sequential fashion, where single records are created for each document collected and processed. These systems work well for paper files in a filing cabinet or for text emails with attachments. However, if an electronic document contains other elements such as embedded or linked objects, information regarding the linked or embedded objects may become lost when creating an index in this manner.

To solve this problem, the present invention creates a record or index of a native document and the visual representation of all objects linked to or embedded within the native document, as well as a separate record for each linked or embedded object. The system then stores this information in a buffer or database. There are many generic methods for dealing with buffering (or caching of data for short-term utilization). Typically it involves storing data in-memory, or as a collection of data objects in memory while allowing this memory to flow to secondary storage if it grows too large. Microsoft®.NET and many other programming environments offer built-in tools for managing this as well as specialized collections ("collections" is a software term for managing one or more data objects, often with various algorithms which can be optimized for the type of objects and access patterns being used). The invention also identifies where all linked or embedded objects are physically located in the native document. The creation of (i) separate records to identify embedded objects and map their location and (ii) an index describing the relationships between embedded objects and documents in which they are embedded, preserves the non-linear elements of the information and allows a collection of documents to be searched and reviewed more quickly by human reviewers. This structural preservation allows for increased precision and recall when implementing data analytics such as proximity or concept searches.

More specifically, the improved precision and recall occurs by taking one or more documents, $d_i$, in their native form and performing an extraction, $e_i$, on those documents as well as on any objects linked to or embedded within those documents, or "embedded objects" $d_k$. As used herein, the subscripts "i" and "k" are used to distinguish between documents, and objects that are embedded in those documents, and are used in conjunction with a letter such as "d" to identify what is being described, i.e. "d" for document, "f" for file, etc. Extraction, $e_i$, refers to a process of collecting data, $da_i$, from a document, $d_i$. Collectively, the data, $da_i$, a subset of which can be denoted in one embodiment as text, $t_k$, may encompass virtually any type of data which includes text or can be converted to text and/or metadata such as text itself, graphical, visual, auditory data, etc.

The term "data" represents an abstract notion of virtually any type of information from which text and/or metadata can be identified. For example, an audio file could be embedded in an email (e.g. voicemail sent as an email), Alternatively, a vector file, graphic file or any other type of file type may be embedded within the document. Extraction of the audio information would require application of voice-to-text recognition software as well as extraction of the text. Alternatively, visual data like a movie could be present and extracted using standard methodology. The term "extraction" is used interchangeably with the term "ripping." "Ripping" refers to the direct extraction of embedded objects. The extraction, $e_i$, may be performed 1 to n times on any document, $d_i$. The term object, $d_k$, refers to any type of information in electronic format, such as (without limitation) files, documents, records, tables, images, pictures or other graphics, which may be linked to or embedded within the document, $d_i$.

Data from document $d_i$, which can be represented as $da_i$, recovered from the extraction, $e_i$, is then stored in a database or buffer. The data, $da_i$, can be virtually any type of data which includes text or can be converted to text and/or metadata such as text itself, graphical, visual, auditory data, containers (data files which contain other files/objects such as archive files, email repositories, etc.), programming instructions and others. See http://en.wikipedia.org/wiki/Data_type [retrieved on 2011-10-06]. The database or buffer, b, features an index, i, where data, $da_i$, from documents, $d_i$, and objects linked to or embedded within those documents, $d_k$, are maintained as separate records. The creation of separate records together with an object map, m, for the documents or objects $d_i$ or $d_k$ preserves the overall relationships among embedded objects. By preserving the relationship of the objects within the documents, the map enables the human reviewer to quickly access a particular visual representation of an embedded object or an attached object (i.e. think file attachments to an e-mail) as they are seen in the native version of $d_i$.

For clarity, the objects are sometimes referred to as "children," and the documents in which they are embedded referred to as "parents". Furthermore, $d_i$ and $d_k$ are kept as separate records and any versions or changes inherent to either are preserved. The overall structure of a document, $d_i$, with embedded documents, $d_k$, is illustrated in FIG. 1A. A document $d_i$ has n objects $d_k$ shown here as $d_k$, $d_{k+1}$, $d_{k+2}$ and $d_{k+3}$ embedded in the document at the first level, Level 1. In this illustration, in the visual representation of $d_k$, there is another embedded object, $d_{k+4}$ at Level 2 and in that visual representation, there is another embedded object, $d_{k+5}$ at Level 3. As will be appreciated, there may be 1 to n levels for each document, $d_i$, with 1 to n embedded objects, $d_k$, embedded within the visual representation at each level. In other words, an embedded object may itself have an embedded object within it and so on for at least 1 to n number of levels. Additionally, each level may contain a plurality of embedded objects, $d_k$. See e.g., FIG. 1A, Level 1. The index that is stored in the buffer maintains the overall relationship or map not only within a level and document, $d_i$, but also between levels and between objects, $d_k$. The number of levels may range from 1-100, 1-250, 1-500, 1-1000 or 1-1024, etc.; however, there is no upper-bound limit on the number of levels that the systems and methods of the present invention can address.

Each document, $d_i$, or embedded object, $d_k$, may have at least one individual identifier, $id_i$ or $id_k$, associated with it. File typing is also capable of dealing with multiple types of documents. Most of the common document types have published portions of the underlying file type that can be used to identify the actual document type. Additionally, there are many files types that have a defined structure and are an accepted international standard (e.g., RFC-422 for EML (specific format of some emails)).

Other methods require interpretation of the file type based upon the data structures themselves. As a result, file typing cannot be 100% accurate and sometimes must rely on "cues" in the data and/or metadata to determine the most likely file type. Accordingly, the file typer of the present invention outputs a confidence level of the file type identification so that other file types may be evaluated to identify instances of false positives. The confidence level may be one of four values: Unknown, Metadata Only, Data Only, Metadata and Data Validation. "Unknown" refers to an instance where file type could not be identified by any method. "Metadata Only" indicates that metadata, such as file name extension to file type, was used to identify file type because data in the file could not be used to further narrow down the file type. "Data Only" means that after examining the data contained within the file, the system identified the type of file, but either the metadata associated with the file did not indicate what kind of file it should be, or the metadata did not agree with the internal data associated with the file. For example, there may be instances where a Microsoft® Word® document has a file extension of a Microsoft® Excel® spreadsheet (.xls) but the data internal to the file shows that it is a Microsoft® Word® document. Finally, "Metadata and Data Validation" refers to an instance wherein both metadata and internal data agree as to file type.

The file typing can use cues such as the file extension to determine what the most likely file type is likely to be. This very often avoids needlessly checking hundreds of other file type formats and also reduces the chance of a "false positive." Many files types have what is known as a "Magic ID," which is simply a sequence of bytes (sometimes sequential and sometimes not) that would have the same value or a known range of values at one or more specific locations (may be absolute positions or relative positions within the actual file). Other types share common structures (Microsoft® Office® files, for example) such as the Microsoft® Structure Storage which require code to read this structure and interpret various "streams" of information to determine the underlying file type. For example, Microsoft® Word®, Excel® and even a PST (email container) utilize the structure storage system to organize the actual specific data in a similar fashion, but the actual data itself is completely unique to the document type. Because any particular extraction, $e_i$, is based on the particular file format or type, $f_i$ or $f_k$, of documents or embedded objects, $d_i$ or $d_k$, respectively, the extraction, $e_i$, of information from documents can result in increased efficiency both in processing time and data recovery.

The detailed description of the invention that follows may be defined using terms associated with algorithms and symbolic representations of operations on data bits within a computer memory. Descriptions based on algorithmic descriptions and representations are frequently used by those of skill in the art to describe the substantive processes and workings of their inventions. An algorithm is an effective method for solving a problem expressed as a finite sequence of instructions or steps. The steps are defined as the physical manipulations of electrical or magnetic signals. Moreover, the detailed description of the invention may be described or labeled in terms of computer programs. Programs are sequences of instructions written to perform a specified task for a computer or similar electronic device. As used throughout this application the use of "program," "process" or "algorithm" is not limited to any particular source code. Instead, these terms are used as convenient labels to describe the functions or executions associated with the invention.

Each of these terms still applies to the appropriate physical quantities and is merely labeled in this fashion for convenience. As will be apparent from the following discussion, it is appreciated that throughout the description, the terms "processing" or "scanning" refer to the action and processes of a computer system or similar computing device.

The term index means a data structure that improves the speed of data retrieval operations on a database table at the cost of slower writes and increased storage space. BIENIEK, Daren et al., 'SQL Server 2005 Implementation and Management', Chapter 4: Creating Indices (Microsoft Press 2006).

The present invention also relates to any apparatus, tool or computer system for processing information recovered from an extraction. The invention may incorporate a specialized computer for performing the method or any other computer running the required program. The system may use any type of machine-readable storage medium such as read-only memory ("ROM"); random access memory ("RAM"); magnetic disk storage media; optical storage media; flash memory devices; electrical, optical, acoustical or other form of propagated signals (e.g., carrier waves, infrared signals, digital signals, etc.). GANTZ, John F. et al. 'The Diverse and Exploding Digital Universe'. In International Data Corporation via EMC [online]. March 2008 [retrieved on 2011-10-06]. Retrieved from the Internet: <URL:http://www.emc.com/collateral/analyst-reports/diverse-exploding-digital-universe.pdf>. Various general purpose systems or computer processors may be used with the process and programs described within. These systems may be composed of assortments of servers, processors, engines and computer or machine readable storage media. However, specialized apparatus may also be designed for use with this system. In addition, the present invention may be run on several different programming languages, including, without limitation, Smalltalk, Eiffel, Ruby, JADE, C++, C#, Java or Python. FISHER, Steven R., 'A History of Language', p. 205 (Reaktion Books 2003).

The system and method is not limited to any particular network. The system and method can function over the Internet, local area networks (LAN) or any other type of network, portions of a network, or through a cloud computing system (see http://en.wikipedia.org/wiki/Cloud_computing [retrieved on 2011-10-06]). Furthermore, the system and method is not dependent on any particular data transmission rate. The individual components of the system (i.e. servers, processor, storage media, etc.) may likewise function irrespective of their physical locations as long as they incorporate means of communicating with other components.

Finally, the system and method can incorporate any number of terminals. The terminals are used for the input, such as search commands, or the output, such as the display of search results, of data. The terminals in this case can refer to personal computers, workstations, laptops, monitors, or other communication devices. As used herein, visualization of data refers the precise recall of a version of a document and any version of an object linked to or embedded therein at a particular time as would be perceived on the native document. Visualization of data as seen by the initial user in its relation to OLE does not depend on any particular terminal. Stated differently, the visual representation of a linked or embedded object in a file processed using the systems and methods of the present invention is the same, both in substance and in physical location, as in the native file. Embedded objects are increasingly common in email as well as and in many other common Microsoft® Office® documents, including, Microsoft® Word®, PowerPoint®, Excel®, and so on. Additionally other document types such as PDF's and Open Office commonly employ them. See generally, http://en.wikipedia.org/wiki/Object_Linking_and_Embedding [retrieved on 2011-10-06].

The following invention includes several components, which form the basis of a file conversion and indexing method. The term component is used only for convenience and may refer to an assortment of storage media, computer processors or programs. The invention is not limited by the location or physical presence of the individual components as the term could refer to functions inherent to the system or method. The term components could be physically inseparable, interconnected on a network or occurring within a single server, processor or other device.

Working together, the components of the invention allow for improved precision and recall of electronic documents. The content extraction of files occurs by taking one or more documents, $d_i$, from a source of electronic documents and performing an extraction, $e_i$, or ripping on it and any one or more objects embedded within, $d_k$. The terms extraction and ripping may be used interchangeably. The particular extraction, $e_i$, is based on the particular file format or type, $f_i$ or $f_k$, of the documents $d_i$ or objects $d_k$, respectively. The terms objects and documents can be used interchangeably as the object $d_k$ is also a document, although only a part of a document. The format for each document or object, $d_i$ or $d_k$, is determined by a file typer. The data, $da_i$, recovered from the extraction, $e_i$, is then stored in a database or buffer, b, which features an index, i, where data from documents and objects, $d_i$ and $d_k$, are kept as separate records allowing any versions or changes to $d_i$ or $d_k$ to be preserved. This data includes an object map, m, for documents $d_i$ or objects $d_k$, which identifies the physical location of the objects within the documents and preserves the visualization of the data relating to $d_k$ as it is seen in $d_i$. The object map, m, and the separate records increase precision and recall when performing data analytics. "In-line text extraction" is done on the visual representation when available (and appropriate) and the full embedded object is extracted and further processed on its own as a child document.

Figure 1B:
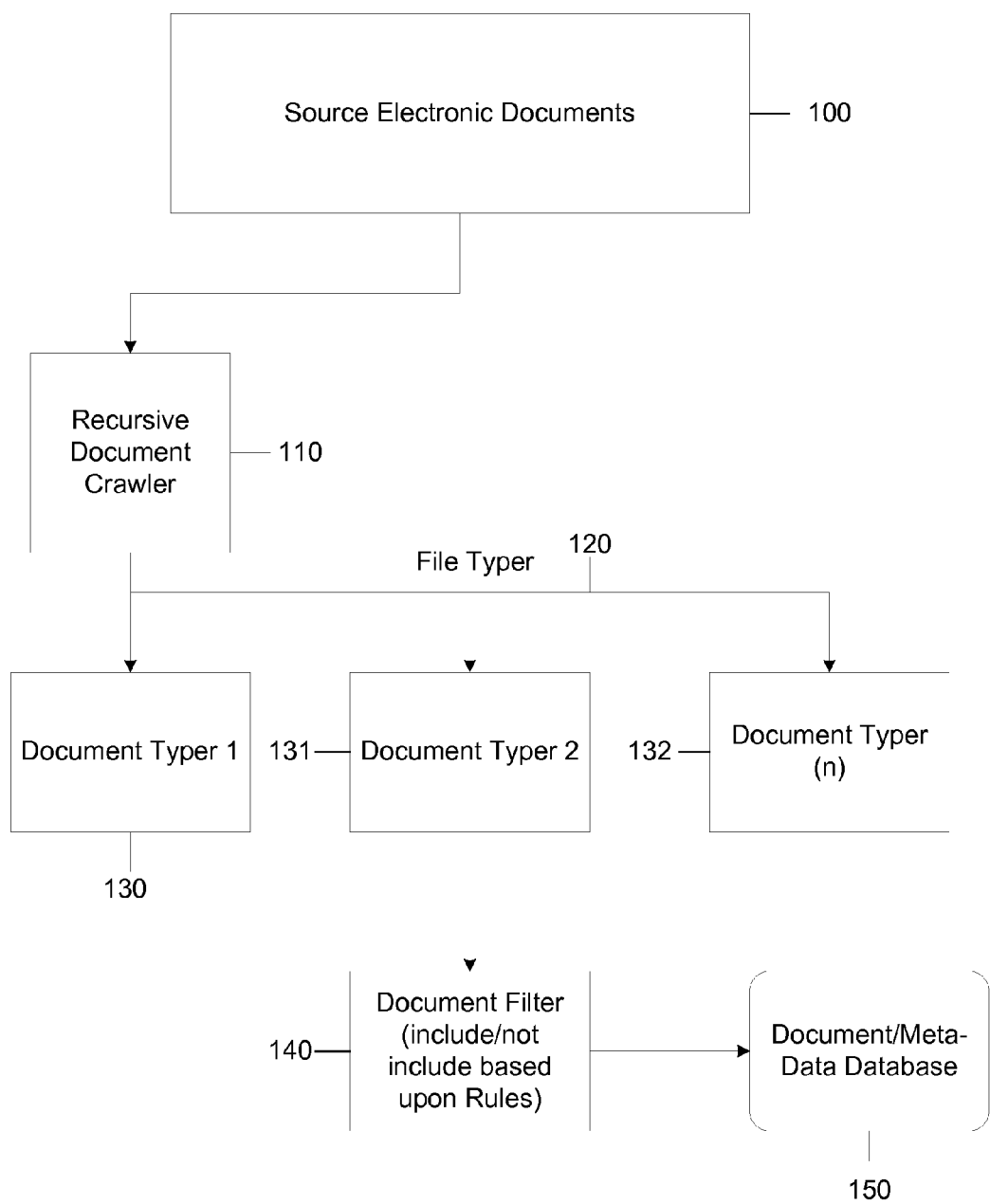
FIG. 1B is a block diagram of an embodiment of the invention representing a workflow of document file typing.

Referring to FIG. 1B, the methods and systems of the present invention can include a source of electronic documents 100. The source of electronic documents 100 contains documents in their unprocessed or native form. In one embodiment, the source of electronic documents 100 is scanned recursively or examined through one or more other iterative processes to locate each of the electronic objects or documents contained in both parent document as well as the child document. It is important to note that the source of electronic documents 100 comprises any type of computer-readable storage medium. The storage medium can be both internal or external to the system or encapsulated in any type of device capable of inputting data. Similarly, the term electronic documents can refer to any documents stored in electronic form, including those embedded within other documents, as well as files, objects, records, etc.

New file types are constantly being created. The currently available ECA processing tools are slow to adapt to newly created file types because most ECA processing tools rely on outside software utilities and tools wrapped in their proprietary workflow and code, preventing alteration. BUCKLES, Greg. 'The Devil is in the Details—Processing Pitfalls'. In eDiscovery Journal [online]. Apr. 29, 2010 [retrieved on 2011-10-06]. Retrieved from the Internet: <URL:http://ediscoveryjournal.com/2010/04/the-devil-is-in-the-details-%e2%80%93-processing-pitfalls/>. Consequently, objects with unknown file types cannot be processed with these ECA processing tools, and often need to be moved outside the system for processing. The problems inherent to current ECA processing tools also extend beyond unknown file types. Current ECA processing tools are oriented towards processing a limited number of different parameters such as owner of the file and location stored. However, with the explosion of electronic data, files are stored in ways that they become associated with multiple different types of criteria such as location, version, owner, date of storage, etc. In order to accurately review the data, ECA processing tools must take into account all of these relationships when storing and processing information. Accordingly, the system can also include a file typer 120.

The file typer 120 determines the file type of each document. The file typer 120 may be a program, process or algorithm or a function of a processor or engine. The determination of the file format or type, $f_i$ or $f_k$, of $d_i$ or $d_k$, respectively, is important as each file is processed according to its particular file type.

Figure 4:
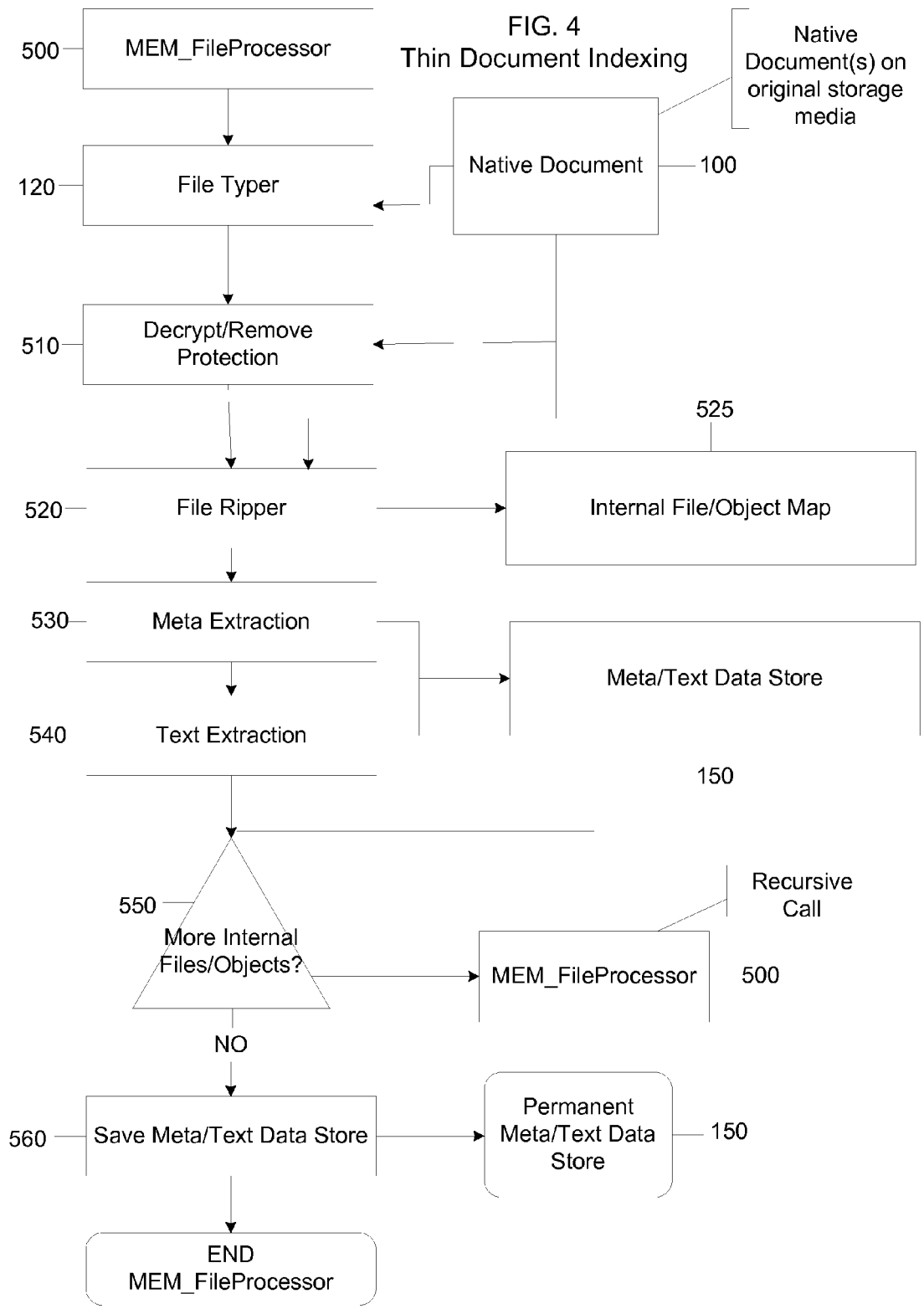
FIG. 4 is a block diagram representing a workflow of one embodiment of the invention.

As shown in FIG. 4, the invention may also have incorporated within its program a file decryptor 510, which removes encryptions or password protection from the documents. RUBENS, Paul, 'PGP's Universal Server Provides Unobtrusive Encryption'. In Enterprise Networking Planet [online]. Dec. 22, 2008 [retrieved on 2011-10-06]. Retrieved from the Internet: <URL: http://www.enterprisenetworkingplanet.com/netsecur/article.php/3792771/PGPs-Universal-Server-Provides-Unobtrusive-Encryption.htm>. The system also uses a file ripper 520. A file ripper 520 is a program used to extract data (i.e. perform the extraction, $e_i$) from a file, where the data includes, without limitation, embedded objects, text, images and metadata; note, this list is only meant to illustrate the diversity of different file types which can be extracted. The particular file ripper 520 used is based on the file format or type, $f_i$ or $f_k$, as determined by the file typer 120. This enhances the rate and quality of information retrieved, processed and analyzed from the system as the file ripper recognizes what data in a given file format may be extracted.

The various file formats are housed in a library of document typers represented by 130, 131, 132 (FIG. 1B) which identify file types of electronic documents. The system's library of document typers 130, 131, 132 has increased modularity due to its object-oriented programming. This allows the library 130, 131, 132 to be extended using Plug-in technology in order to add new file type support without having to rewrite or impact the overall performance characteristics of the system. Updating of the library 130, 131, 132 can occur through an iterative process as previously unidentified file types are identified. The library 130, 131, 132 can be located in the same engine, storage media or server as the other aspects of the system or in an external component which is in communication with the system.

Figure 5:
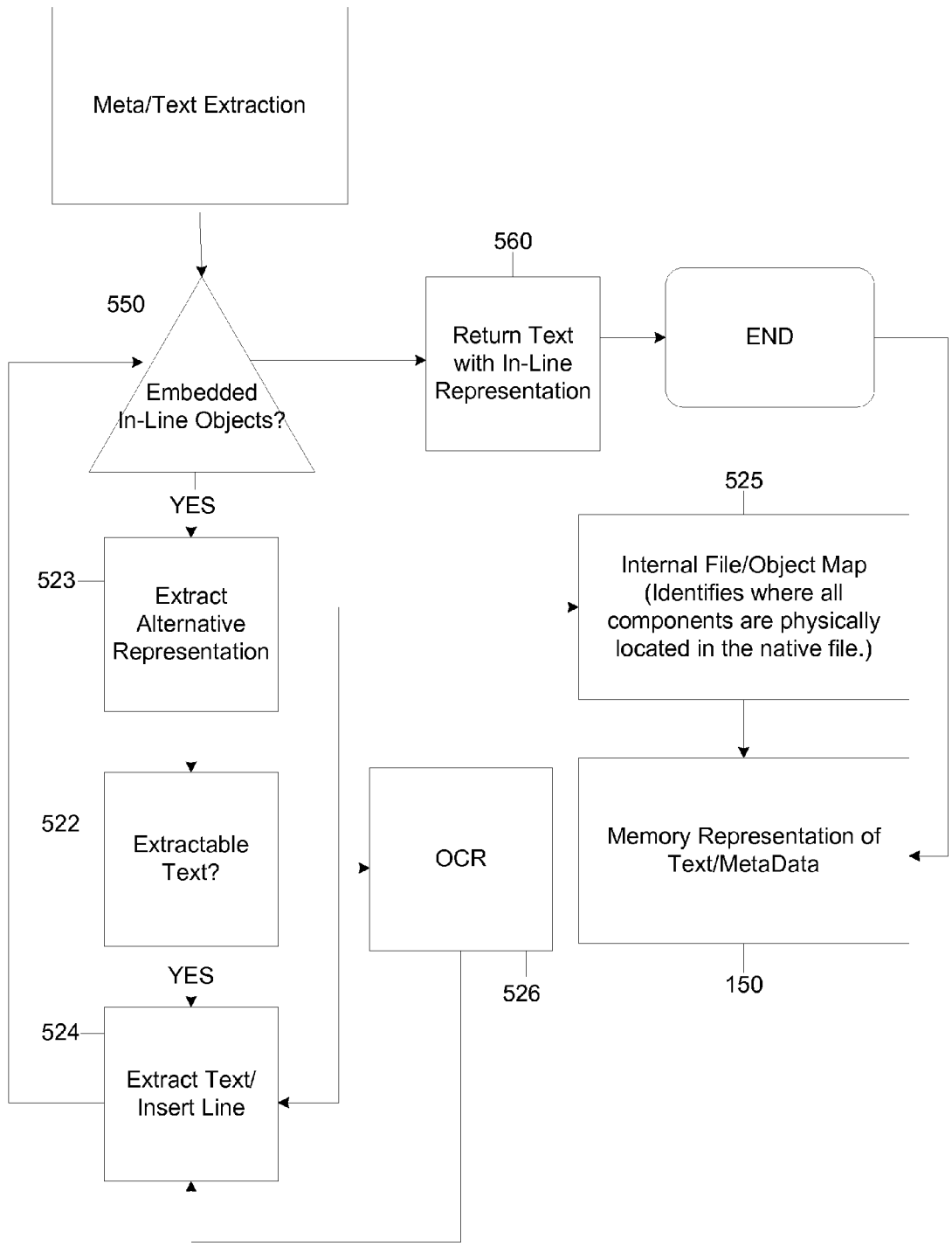
FIG. 5 is a block diagram detailing a workflow of metadata and text extraction from embedded or linked objects.

The file ripper 520 (FIG. 4) extracts data from a native document and indexes a replication of the data within a shared-memory process. Particular data extracted includes (i) each document's metadata, (ii) information describing the parent-child relationships between documents and objects linked to or embedded within those documents, (iii) text and visual representations from each document or object being processed, (iv) an object map 525 and (v) directory structures. Collectively, the data, $da_j$, a subset of which may be denoted in one embodiment as text, $t_k$, may encompass virtually any type of data which includes text or can be converted to text and/or metadata such as text itself, graphical, visual, auditory data, etc. Extraction occurs as the file ripper 520 tests 550 for embedded or linked objects, $d_k$, within one or more documents, $d_j$. If embedded objects are found, the system will perform a recursive extraction and recordation (FIG. 5). Records of documents and their embedded or linked objects, if any, are separately indexed to increase precision and recall, especially when performing advanced data analytics as demonstrated more fully in FIGS. 6A-C. Importantly, data extraction is performed on as many levels of embedded objects as exist within a particular document, $d_j$, if there are objects embedded within objects as shown in FIG. 1A. The system and method of the present invention extracts and records data relating to multiple levels of embedded objects and preserves the relationships between parents and children.

The file ripper 520 encompasses a series of programs or algorithms. The process of file ripping can occur within one or more engines, storage media or servers. The extracted data can be processed into a read-only format allowing for storage and subsequent indexing. The storage and indexing may occur with the same engine, storage media or internal or web-based server as the file ripper 520, or can occur in another engine, storage media or server, which is in communication with the file ripper 520.

The system of the invention also comprises a database (buffer) or other storage media 150 (FIG. 1B). The database 150 is capable of receiving information from the rest of the system, such as extracted data from the file ripper 520, and storing and indexing the information. The storage of data is subject to practical limits such as the size constraints in the system. The system may incorporate various storage and indexing techniques known in the art to increase the manageability of the data such as using memory mapped files using windowing techniques to reduce the virtual footprint. The database's 150 indexing structure may be composed of any commercially available ANSI SQL-compliant database format or other similar programmatic methods such as B-Trees or other record management and related algorithms and methods. The database 150 is further capable of receiving input and providing output. Furthermore, the data stored in the database may be manipulated, while still preserving the processed data. For example, the data in the database 150 may be viewed, searched, or redacted without disrupting the underlying metadata, textual or other type of data.

Figure 3:
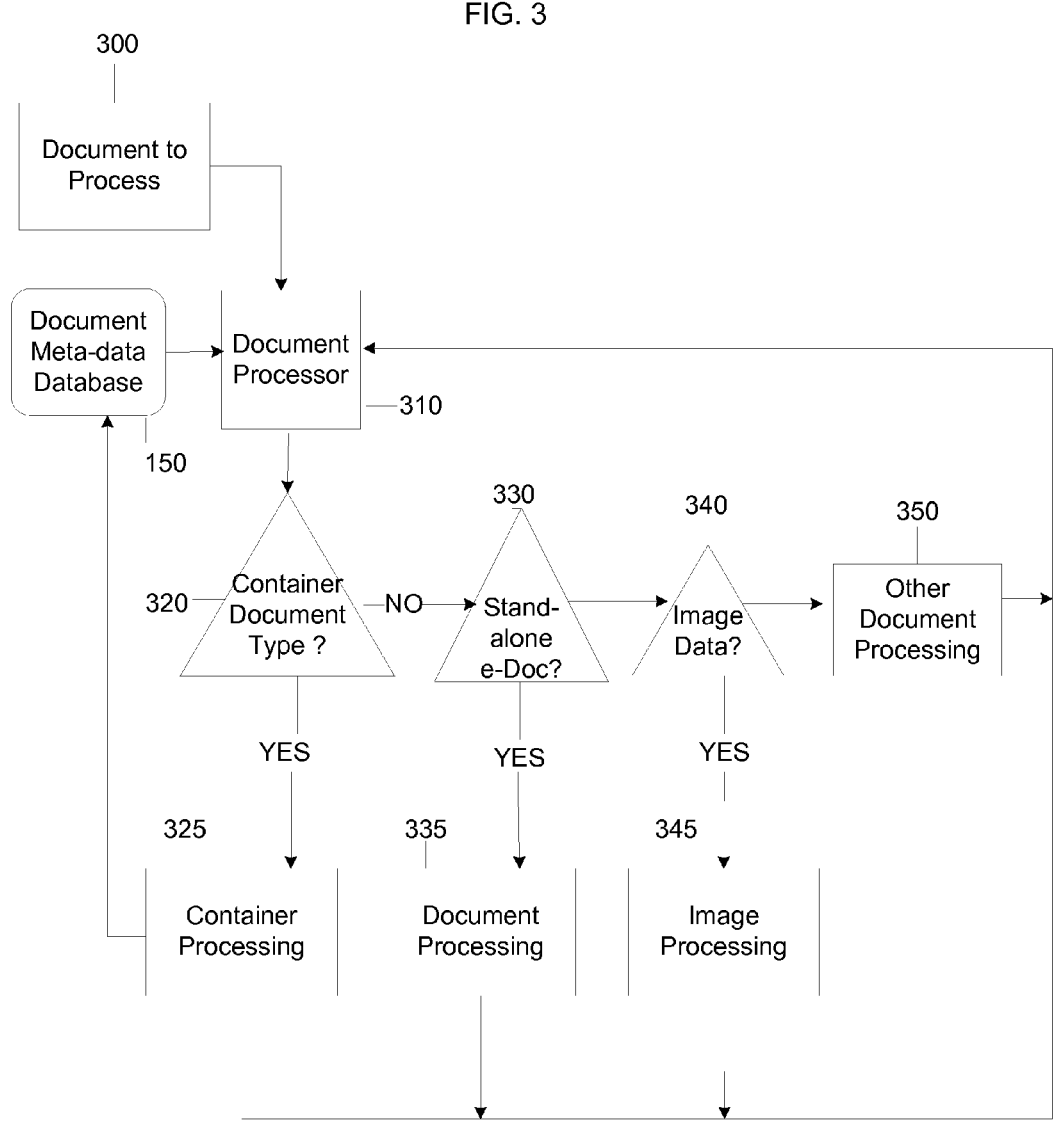
FIG. 3 is block diagram of an embodiment of the invention representing a workflow of recursive file ripping.

If the document to be processed includes an embedded image, the invention determines the type of image 345 and processes the image with optical character recognition ("OCR") libraries to extract any text contained inside, so that the textual content can be searched (FIG. 3).

The system also (optionally) identifies and eliminates duplicates of documents, which have already been extracted, processed and analyzed, through the use of a document filter 140 (FIG. 1B). Document de-duplication ("de-duping") is achieved through a number of cryptographically strong (MD5, SHA1 and SHA256 are the most commonly used methods today), many-to-few bit mapping algorithms, which ensure accuracy in de-duplication. For example, one embodiment uses a hashing algorithm such as MD5 with another cryptographically strong algorithm such as SHA1 to ensure the accuracy of the de-duping process. The MD5 and SHA1 signatures are computed for each document object as it is being processed. The hash signatures of an email message are computed using the "To," "From," "Subject," "Send Date/Time," "CC," "BCC," and "Body" fields of the message or optionally from other combinations of metadata associated with the emails. The MD5 and SHA1 signatures of any attachments are computed next and added to the original MD5 and SHA1 signatures to produce the final value. Attachments are not removed from the email message. However, an embodiment of the invention stores the MD5 and SHA1 signatures of any attached files individually, so that if the same file which is attached to an email message also appears separately in the information system, that second instance of the file will be recognized as duplicative of the instance of the file attached to the email message.

The document filter 140 is further able to sort or eliminate documents based on instructions or rules established by a user (FIG. 1B). These instructions could be based on any combination of criteria such as date range, a particular data characteristic, a file type or the directory or path of the document in the source of electronic documents 100.

An index for the document/meta database 150 may be accomplished using a "thin" or "sparse" index type. A thin index is a file with pairs of keys and pointers for every block in the data file. Every key in this file is associated with a particular pointer to the block in the sorted data file. In clustered indexes with duplicate keys, the sparse index points to the lowest search key in each block. One embodiment of the present invention utilizes a thin index, which creates an index of text, metadata and physical relationships without saving the native data associated with a document to a storage device. This allows for fewer inputs/outputs and permits data to be extracted in a "just in time" fashion when the data is needed, which advantageously provides for faster access to data and reduced utilization of scarce system resources such as memory and disk storage.

According to another aspect of the invention, the system allows for the extracted and processed data found in the database 150 to be searched by the user in a variety of different ways. The search commands can be inputted by a user into the system through a terminal and can relate to any characteristic of the data such as particular instances of textual data or metadata words or relationships. The types of searching can include stemming from the root of common forms of a word or words, searching for synonymous words or expressions, or phonetic, fuzzy, Boolean, truncation, nesting or stop words searching. These searches may be performed "on-the-fly", or saved as predefined searches by the user, and may incorporate metadata retrieved from the information system or systems being processed. The system also permits the use of proximity operators during searches. For instance, a user may search for "Word A" within 5 words of "Word B." In one embodiment, the system and method of the present invention can provide keyword suggestions during keyword searches based on standard statistical search methodology. These suggestions may be related to variations on the words provided by the user. This type of relationship enables the user to determine the most advantageous terms to use during keyword searches. Suggestions may be provided in real-time as the user types the search terms into the interface, or they may be provided as part of the search report generated for the search terms utilized in a particular keyword search or through the use of synonyms, hypernyms, hyponyms and antonyms. This report enables subject matter experts to review these terms to determine which queries will provide the most complete and comprehensive search for responsive documents. Additionally, searching using other search engines such as concept search engines is fully supported within the system.

The data may further be manipulated through such procedures as redacting, tagging or posting comments about particular documents that are maintained and viewable with the data. The manipulations may be removed, viewable only to certain users or added to without disrupting the underlying data organization.

The invention retrieves data from an information system or systems which store the source of electronic documents 100 to be processed (FIG. 1B). The data from the information system or systems in its native format may be stored either internally or externally to the system. The source of electronic documents 100 may include multiple different types of electronic documents, any of which may be linked to or embedded within other documents. For instance, the documents may include email messages with or without attachments or other types of linked or embedded information. The email messages may be in a variety of formats, such as Microsoft® Outlook® or Microsoft® Exchange or Lotus Notes®, as well as AOL® or web-based email services like Google's® Gmail™ or Microsoft's® Hotmail®. The documents may also include word processing files created by software such as Microsoft® Word® or Corel® WordPerfect®, spreadsheets created by software such as Microsoft® Excel® or Lotus® 1-2-3, Microsoft® PowerPoint® presentations, or .pdf files for use with Adobe® Acrobat® or similar software. Other examples may include any other text or data files, including images, video and audio files and any other information or file, which may be stored digitally and processed by a computer. A recursive document crawler 110 processes the ESI retrieved from the source of electronic documents 100 to ensure that all document objects, $d_k$, are retrieved. Recursion is frequently used in the art to process objects which may contain other objects, which may themselves contain other objects. The recursive document crawler 110 can be identified as any program or a process housed in the same engine, storage media or server as the other aspects of the system or in an external component which is in communication with the system.

The file typer 120 determines the type of the file and enables the system to process a large number of different file types. A source of electronic documents 100 may include both multiple files as well as a number of different file types. Accordingly, the file typer 120 includes a library of document typers 130, 131, 132. This plurality of document typers 130, 131, 132 enables the file typer 120 to not only determine the type of a number of different file types, but also process these diverse file types. The file typer 120 can utilize an extensible, modular, objected-oriented software framework located in library 130, 131, 132. Additional document typing modules may be added to this framework to enable the file typer 120 to process unrecognized file types without disturbing the file typer's 120 capacity to process extant, recognized file types.

One or more document filters 140 may be used as desired to cull the electronic documents retrieved, processed and analyzed. For instance, in response to a request for production of documents, the responding organization may be compelled to identify the custodians of the requested information. Custodians will generally be those individuals having read and write access to the relevant files. To the extent that the identity of custodians is known at the outset of the discovery process, determined during the discovery process, or both, document filters 140 enable the user to limit the scope of information processed and analyzed using the present invention to only those documents possessed or written by the relevant custodians. This filtering further reduces the volume of information to be analyzed and reviewed, thereby cutting the time and therefore, the expense associated with document discovery. The document filters 140 are not limited to filtering based on custodian information. Other filters enable similar reduction of the scope of information retrieved, processed and analyzed on the basis of, without limitation, file size, date and time of file creation or modification, file type, file type classification, or both.

Figure 2:
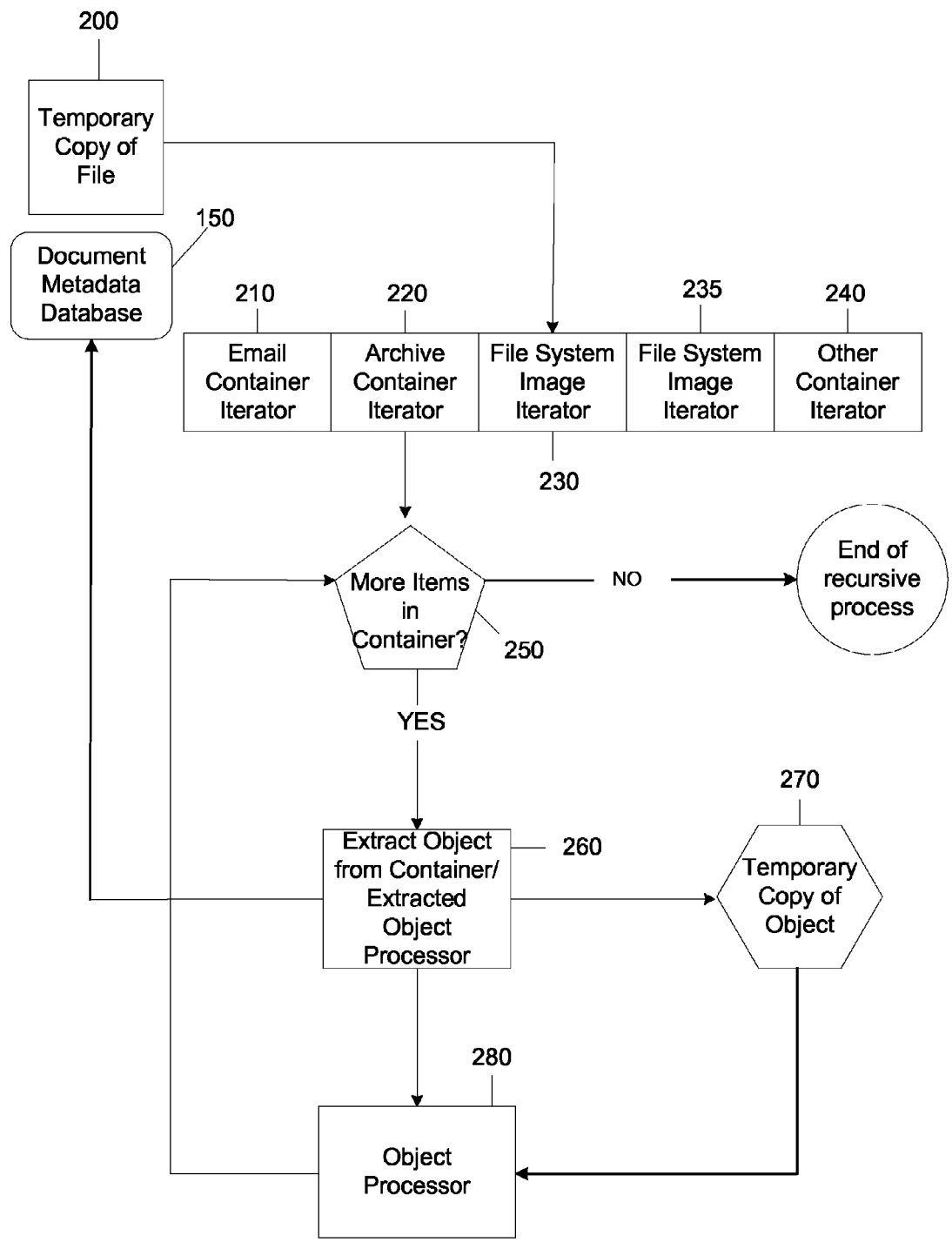
FIG. 2 is a block diagram of an embodiment of the invention representing a workflow of object-oriented programming.

FIG. 2 displays the system's object-oriented programming layout associated with the file ripper 520 (FIG. 4). The programming logic sends a temporary copy of file 200, through file typing iterators 210, 220, 230, 235 and 240. The particular iterator that processes the temporary copy of file 200 corresponds to the file format of the temporary copy of file 200. The file typing iterators 210, 220, 230, 235 and 240 are independent modules, allowing for the addition of new modules to the library 130, 131, 132. These typing iterators 210, 220, 230, 235 and 240 process temporary copies of files and determine whether files are containers (i.e., collections of multiple objects). These containers may represent an electronic file or document such as an email, and an embedded object extracted from the object 260 may represent an attachment to that email.

The system recursively processes the temporary copy of file 200, now determined to be a container, and searches for other linked or embedded objects 250 (FIG. 2). If found, such embedded objects will be further processed for additional embedded objects in an embedded objects processor 260. The embedded object processor 260 extracts data from the linked or embedded objects, and the data is sent to the document database 150 (FIG. 1B). Temporary copies of the linked or embedded objects, 270, are also created and sent to an object processor 280, which examines the temporary copies of the linked or embedded objects 270 for additional embedded objects 250, starting the cycle again. Thus, as discussed above, an object $d_k$ embedded in $d_i$ may itself contain additional embedded objects, $d_{k+n}$, where n is an integer between 1 and n and is only used to indicate there may be a plurality of embedded objects or documents, or levels of embedded objects or documents, in $d_i$. See, e.g., FIG. 1A.

A document 300 can be processed in a document processor 310 (FIG. 3). Each document 300 is processed to determine whether it is (i) a container 320, (ii) a stand-alone document 330, (iii) image data 340, or (iv) another document type 350. Each container is processed by container processing 325. Each stand-alone document is processed by document processing 335. Each document with image data is processed by image processing 345.

Documents identified as containers 320 may contain a number of different document file types. For example, a given document 300 may be a container of email messages or a file archive container such as a .zip or .tar file. As part of the container processing 325, the document processor 310 recursively iterates through each level of object contained within the container to ensure that each object contained within the container is retrieved. Although the document processor 310 recursively processes each object within the container so that each object at every level of containment in a container is processed, the invention is not limited to recursive processing of all containers 320.

Each stand-alone document 330 is processed according to its file type. The role of file type determination is illustrated in FIG. 1B. A stand-alone document 330 may contain image data 340. In one embodiment, the system processes files which contain image data 340 by image processing means 345. See http://en.wikipedia.org/wiki/Digital_image_processing [retrieved on 2011-10-06]. Image processing and formats are well specified using International Standards. A plurality of different image types may be processed, including, for example, .gif, .jpeg, .png, .svg, .pdf and .tiff. One embodiment utilizes an extensible, modular, objected-oriented file-typing framework, described previously in connection with FIG. 1B to which additional modules of images processing 345 may be added to process unfamiliar image types without compromising the invention's extant image-processing capabilities. Another embodiment of the systems and methods of the invention utilize optical character recognition so that if a stand-alone document 330 contains image data 340 which, in turn, contains textual information, the image data 340 is processed by one or more optical character recognition modules so that the textual information may be extracted from the image. The skilled artisan will understand that the invention is not limited to a specific method of optical character recognition and that the invention encompasses any optical character recognition technique known in the art.

As the document 300 being processed may be one of many different file types (FIG. 1B), other document processing 350 is also performed as necessary according to the file type of the document object 300 being processed.

The methods of the present invention can extract additional data from each document 300 as it is being processed, including metadata and textual information. This extraction enhances the rate at which data from a source of electronic documents identified as 100 (FIG. 1B) is retrieved, processed and analyzed by creating an index of information so the entire source of electronic documents 100 does not have to be examined. Metadata replicating the structure of each object within each container 320 or stand-alone document 330 is extracted and used in part to create an index which is itself stored in a document metadata database 150.

FIG. 4 represents a workflow diagram of the process employed in the methods and systems of the present invention. According to one embodiment, native electronic documents from the source of electronic documents 100 are processed using MEM_FileProcessor 500. Memory files are handled somewhat differently by every platform, but from an abstract point of view they are the same thing. Memory files allow one to open a file but treat it as if it is all located in memory. This allows users to just address "Bytes" of data at a specific location. The operating system handles moving the data from secondary storage devices into memory in a transparent way to the application.

The file ripper 520 can create a temporary copy of the document, 200 (FIG. 2). The particular type of file ripper 520 used is based on the format of the document being processed, which in turn is determined by the filer typer 120. As previously discussed, the use of different file rippers and typers enhances the rate and quality of data retrieval and analysis.

The file ripper 520 extracts the data from a document, $d_i$, and indexes a replication of the data within a shared-memory buffer 150 (FIG. 5). Particular data indexed in the buffer includes, but is not limited to, each document's, $d_i$, metadata 530, internal file/object map 525, and any text extracted from the document, $d_i$, being processed 540. The file ripper then tests for linked or embedded objects, $d_k$, within the document 550. If found, the system performs a recursive extraction and recordation beginning with file typing 120. The records of the document and its linked or embedded objects, if any, are individually indexed to enable precise retrieval and increased recall of the data contained within the documents being processed, in addition to preserving the physical order of each native document, $d_i$. Additional metadata may be captured by the system through the use of user settings for a more forensic level of recovery of information from files depending upon the end user's requirements (e.g. revision information, binary data streams).

FIG. 5 is a block diagram detailing the workflow of the extraction of metadata and textual data from embedded or linked objects, $d_k$. In FIG. 5 each native document from the source of electronic documents 100, is examined for embedded or linked objects 550. If an embedded or linked object, $d_k$, is found, represented as a visual representation or in-line object, shown in FIG. 5 as an alternative representation 523, all textual data and metadata are extracted from the embedded or linked object. If the embedded object does NOT have an alternative representation, the complete text can be extracted and placed in-line (optionally) as well.

If the alternative representation is an image-only format the system can apply optical character recognition 526 to the alternative representation 523 of the embedded or linked object. Other data objects such as audio files can have text extracted in a similar manner using voice-to-text technology. Optical character recognition ("OCR") is the mechanical or electronic translation of scanned images of handwritten, typewritten or printed text into machine-encoded text. The OCR of the alternative representation 523 of the embedded or linked object allows the user to search for a word or phrase, compact the storage of data, display or print copies free of scanning artifacts, and apply techniques such as machine translation, text-to-speech and text mining.

The methods of the system are also capable of determining whether there is extractable text 522 in the visual representation 524 of the linked or embedded object, $d_k$, 523 (FIG. 5). The visual representation is the portion of the linked or embedded object 523 that was viewable to a user in the native document, $d_i$. If extractable text is identified, the system replaces the visual representation 524 with a corresponding in-line text. The replacement of the visual representation with in-line text allows for data analytics to be performed on the native document in the source of electronic documents 100 such as proximity or concept searches. After replacement, the process is repeated until all textual and metadata and object mapping 525 for the native document and any embedded or linked documents 523 has been captured. With the visual representation 524 now replaced, and the native document, $d_i$, processed for optical character recognition, the processed document 560 is now ready for storage in the buffer 150.

Figure 6A:
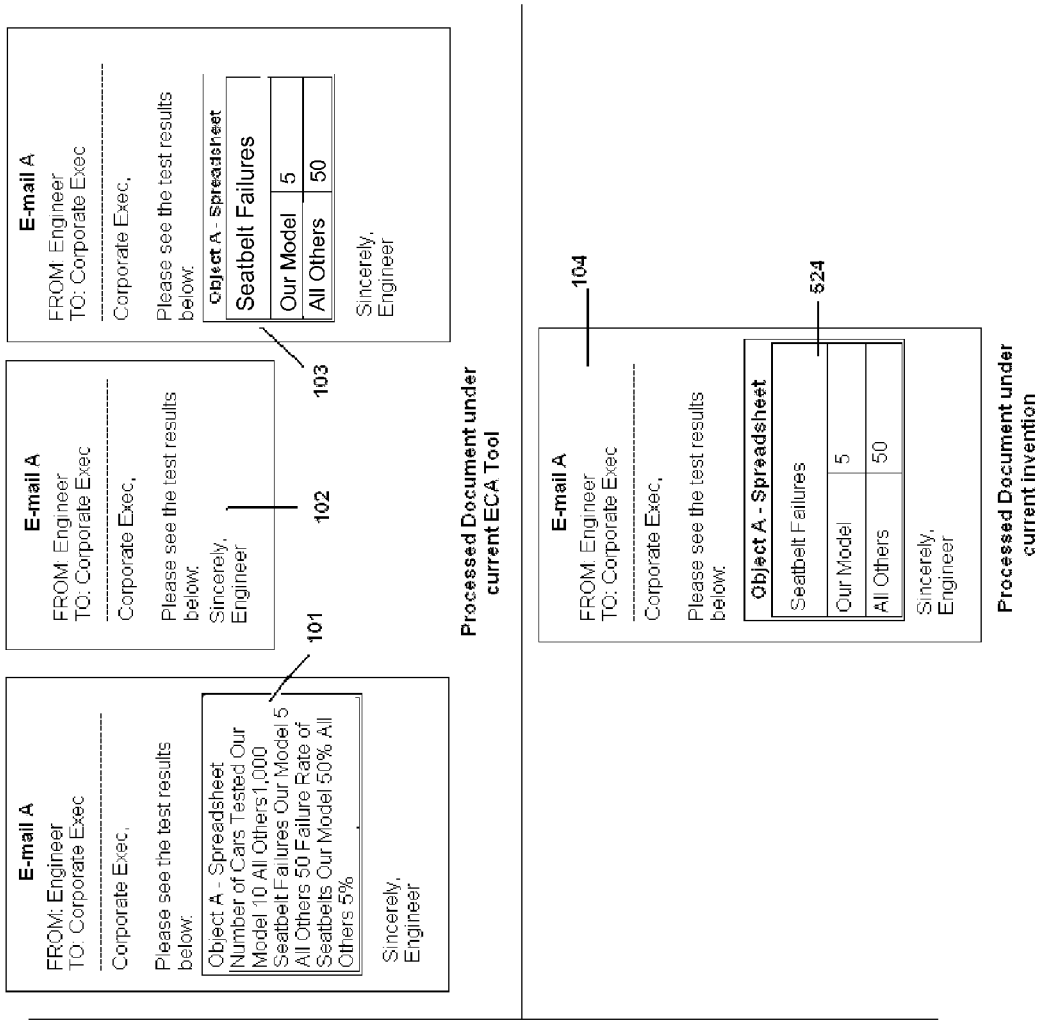
FIG. 6A is a block diagram representing the results of a search query of documents processed by the systems and methods of one embodiment of the invention.

FIG. 6A a block diagram representing a document processed using commercially available ECA tools, such as dtSearch®, Nuix®, AccessData® and the Oracle® Outside In Technology, as compared with processing by the methods and systems of the current invention. In this example, the documents relate to a lawsuit against a car manufacturer for faulty seatbelts. A search query was performed for "Corporate Exec" within ten words of "Seatbelts". Using the currently available ECA processing tools, the visual representations 524 would not be displayed, as shown in 102, or it would be replaced with a picture, as shown by 103 (e.g. bitmap representation of the object). If the visual representation 524 was not displayed or the processing tool could not extract the text within the object 523 embedded in the picture, and only documents 102 and 103 would be returned.

Even if the processing tool is able to extract the text in the linked or embedded object 523, the document may not be returned because the physical location of the text of the visual representation 524 of E-mail A from the source of electronic documents 100 was not mapped properly. For example, if the text of the embedded object was placed at the end of the document or as a separate record, the proximity search would not obtain a result because the linear distance between the two phrases would have been changed. The text of the visual representation 524 will be replaced with all of the unformatted text extracted from the linked or embedded object 523. Because the text of the visual representation 524 is now surrounded by the text extracted from the linked or embedded object 523, instead of the text of E-mail A from the source of electronic documents 100, the search query performed for "Corporate Exec" within ten words of "Seatbelts" does not return the processed version of E-mail A 101.

In contrast, using the systems and methods of the present invention, the processed version of E-mail A as shown in 104 is returned. Because the methods of the present invention replace the visual representation 524 with a corresponding in-line text in the correct physical location due to the object map 525, E-mail A 104 is now returned after applying the appropriate search queries.

Moreover, the relationship between the linked or embedded object 523 and its parent is also preserved. This allows the reviewer to view the linked or embedded object 523, which provides additional information regarding the seatbelt tests (FIG. 6B). In this case, the visual representation 524 suggests that "Our Model" has fewer (5) seatbelt failures than "All Others" (50). However, the linked or embedded object 523 provides additional information, namely that only a few "Our Model" cars were tested, and that "Our Model" also had a substantially higher failure rate. This information could determine the outcome of a trial and shows the need for an expansion beyond linear indexing techniques currently known in the art.

Another example of results obtained with the methods and systems of the present invention is shown in FIG. 6C.

Figure 7:
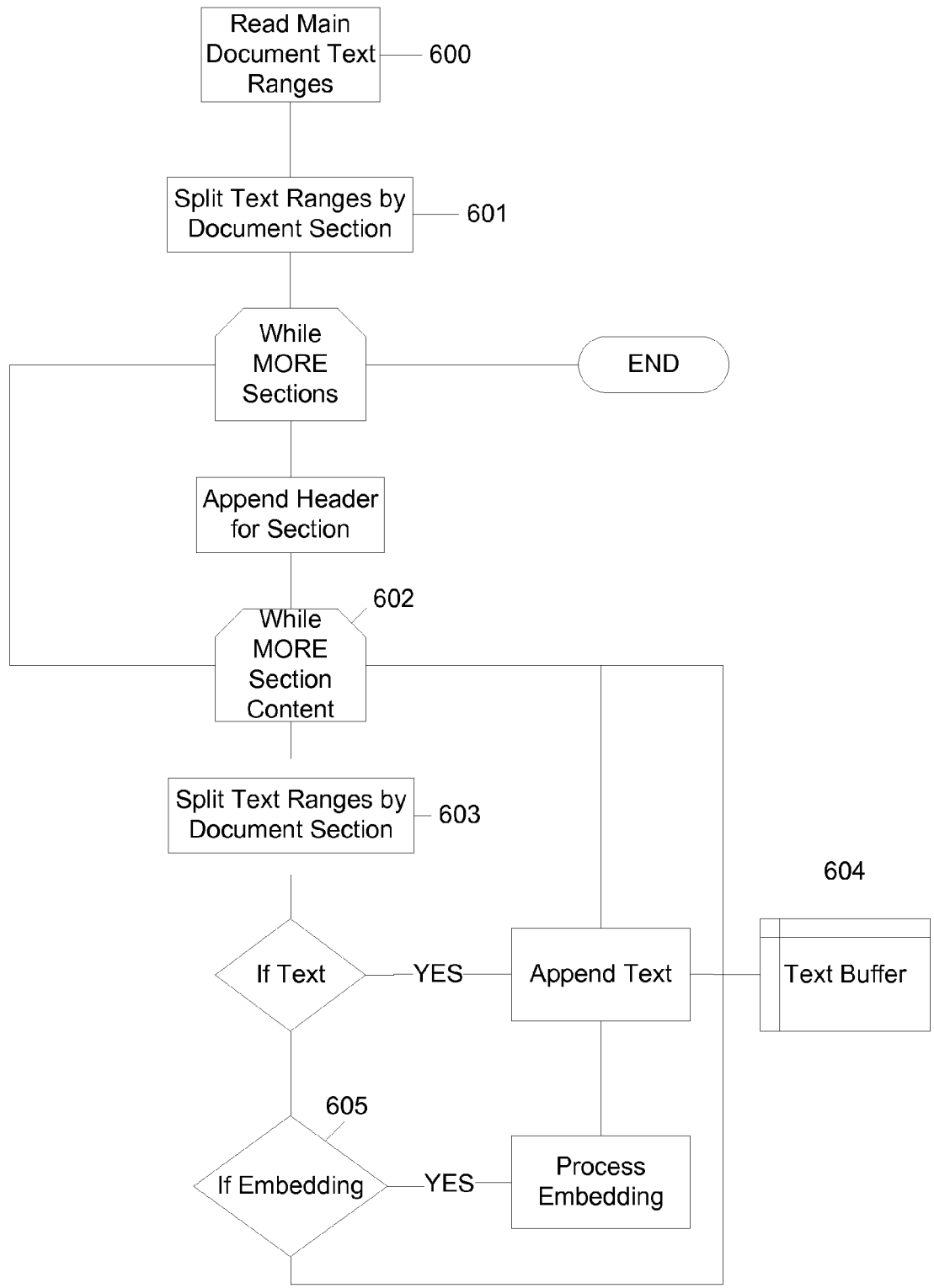
FIG. 7 is a block diagram representing one embodiment of the present invention in which in-line text is extracted and appended to a text buffer.

The methods of the present invention allow for in-line text extraction as shown in FIG. 7. The system performs an extraction on an electronic document, $d_i$. The text ranges of the document, $d_i$, are read 600 and split by document section 601. If more sections and content are detected 602, the extraction splits text ranges by document section 603. If text is detected, the text is appended to a text buffer 604. If an embedded object, $d_k$, is detected 605, the system processes the object and appends any embedded text into the text buffer 604.

Figure 8:
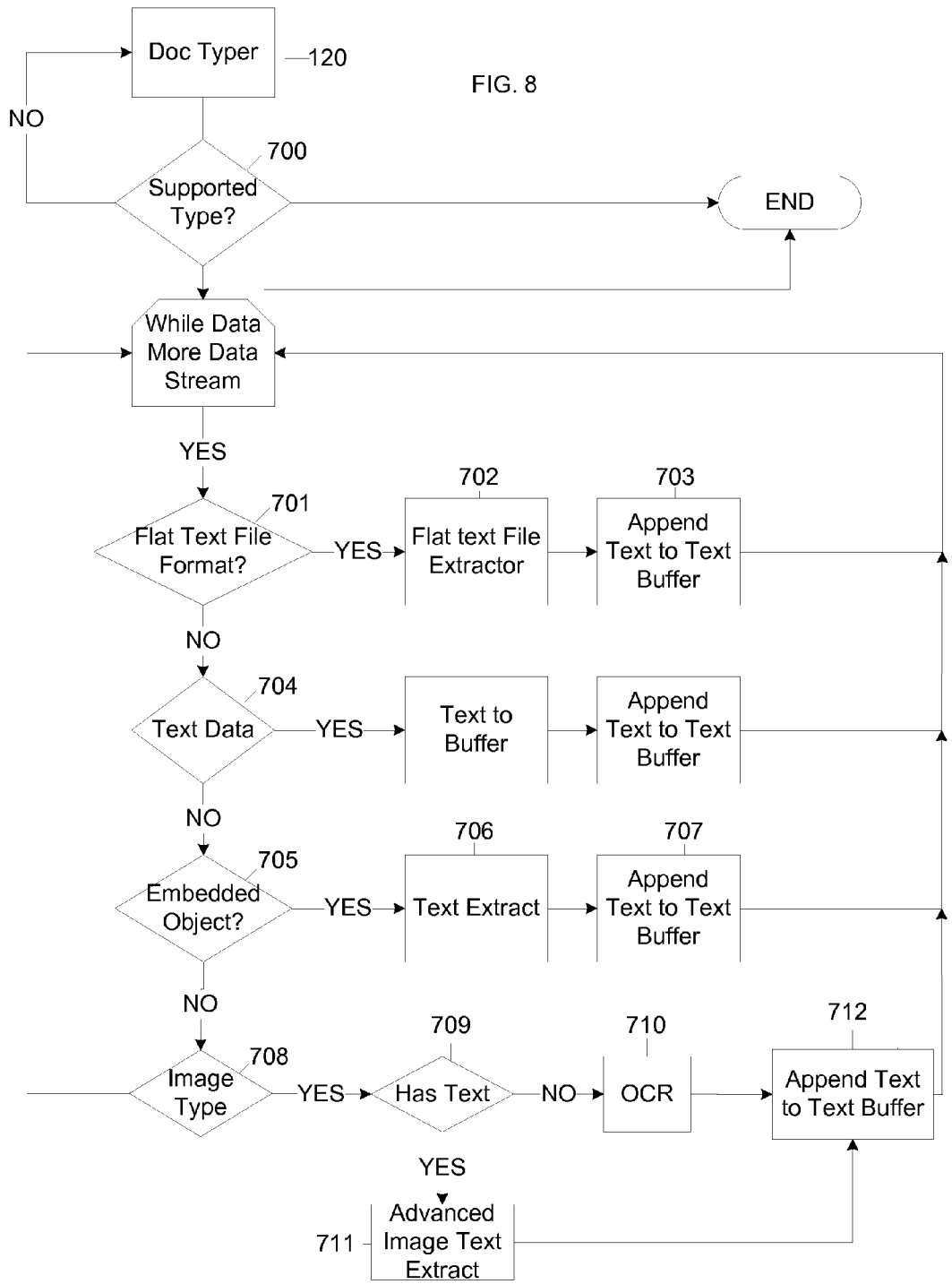
FIG. 8 is a block diagram representing one embodiment of the present invention in which an image embedded in a document is tested for text.

The methods of the invention are also capable of appending text to a text buffer (FIG. 8). In this embodiment, document or file typer 120 determines if a file type is supported 700, and, if so, the document is processed. If a flat text file format is detected by the processing 701, a flat text file extractor 702 extracts text, which text in turn is appended to the text buffer 703. If the processing does not detect a flat text file format, the document is processed for text data 704, which, if detected, is appended to the text buffer. If the system detects neither a flat text file format nor text data, the document is processed for any embedded objects 705. If an embedded object is detected, text of the embedded object is extracted 706 and appended to the text buffer 707. If no embedded objects are detected by the processing, the present invention determines image type 708 and tests the image for text 709 and processes the image with optical character recognition 710 if no text is detected, or performs an extraction of the image 711 and appends any text recovered from the extraction to the text buffer 712.

Specific Examples

The following examples illustrate various embodiments of this invention, but do not limit this invention.

Text Extraction Algorithm by File Type

Terms
EMF: Microsoft® Windows® Enhanced Metafile.
Escher: Microsoft® Office® internal drawing format.
PICT: Macintosh® Picture.
WMF: Microsoft® Windows® Metafile.
1. Excel® (2-2003)
1.1 General Information
1.1.1 The Excel® 2-4 file format is a flat file with a sequence of records representing a single worksheet or chart.
1.1.2 The Excel® 4W file format is a flat file with a sequence of records representing one or more worksheets and/or charts packaged as a workbook.
1.1.3 The Excel® 5/95 format is a Structured Storage file with a main stream that represents the workbook and supplementary streams/storages for embeddings, pivot table caches, etc.
1.1.4 The Excel® 97-2003 format is a Structured Storage file with a main stream that represents the workbook and supplementary streams/storages for embeddings, pivot table caches, revision log, etc. It differs from 5/95 in that it is fully Unicode capable.
1.2 Extraction Algorithm
1.2.1 Find and read the SST (97-2003 only). This loads the set of strings that may be used by cells.
1.2.2 Find and read the BoundSheet information. This tells us where the worksheet boundaries are and tells us the worksheet names.
1.2.3 Find and read the global Format and XF records (except 4W). This tells us how cell values get formatted.
1.2.4 Find the drawing information (97-2003 only).

1.2.5 Find the start of the first worksheet (4W-2003) or BOF (2-4).
1.2.6 Determine the sheet name (5-2003) or find the sheet name (4W).
1.2.7 Append the sheet name.
1.2.8 Load the Format and XF records for this sheet (4W only).
1.2.9 Find and append the headers for the sheet.
1.2.10 Find and append the cell content for the sheet. For chart sheets, the non-default chart information is extracted. For non-chart sheets, the cell content is extracted using the SST, and formatted using the XF and Format records found previously. The content is appended in across-then-down order to facilitate searching.
1.2.11 Find and append the footers for the sheet.
1.2.12 Find and append the textboxes for the sheet. Textboxes float above the cells, so they are appended after the cell content rather than in the middle to facilitate searching. Note that many types of objects qualify as textboxes in this sense: comments, widgets, charts, textboxes.
1.2.13 Find and append the shapes (drawings) for the sheet. Shapes float above the cells, so they are appended after the cell content rather than in the middle to facilitate searching. The drawings may directly contain text instructions in Escher records. If so, that text is extracted and appended.
1.2.14 Find and append the embeddings for the sheet. Embeddings float above the cells, so they are appended after the cell content rather than in the middle to facilitate searching. The embedding preview picture is found in an ImageData (2-5/95) or MsoDrawing record. The preview picture may be a metafile in WMF, PICT, or EMF format. If so, the preview picture text is extracted as the text for the embedding, representing the view of the embedding as it appears on the sheet, as opposed to an extraction of the full embedding contents.
1.2.15 Repeat steps 1.2.6-1.2.14 for each successive worksheet.
1.2.16 Find and append the global external cell cache. This is a cache of cell values from external files that are used within the current file.
1.2.17 Find and append the pivot caches. These are caches of values used in the pivot tables of the workbook.
2. Excel® (2007-2010)
2.1 General Information
2.1.1 The Excel® 2007-2010 file format is a ZIP package with a main file that represents the workbook and supplementary files for each worksheet, pivot cache, external cache, etc.
2.2 Extraction Algorithm
2.2.1 Read the workbook. This tells us about the worksheets and other parts.
2.2.2 Read the SST. This loads the set of strings that may be used by cells.
2.2.3 Read the Styles. This tells us how cell values get formatted.
2.2.4 Find the first worksheet.
2.2.5 Append the sheet name.
2.2.6 Find and append the headers for the sheet.
2.2.7 Find and append the cell content for the sheet. For chart sheets, the non-default chart information is extracted. For non-chart sheets, the cell content is extracted using the SST, and formatted using the Styles information found previously. The content is appended in across-then-down order to facilitate searching.
2.2.8 Find and append the footers for the sheet.
2.2.9 Find and append the textboxes for the sheet. Textboxes float above the cells, so they are appended after the cell content rather than in the middle to facilitate searching. Note that many types of objects qualify as textboxes in this sense: comments, widgets, charts, textboxes.
2.2.10 Find and append the shapes (drawings) for the sheet. Shapes float above the cells, so they are appended after the cell content rather than in the middle to facilitate searching. The drawings may directly contain text instructions. If so, that text is extracted and appended.
2.2.11 Find and append the embeddings for the sheet. Embeddings float above the cells, so they are appended after the cell content rather than in the middle to facilitate searching. The embedding preview picture is stored as a special drawing type. The preview picture may be a metafile in WMF, EMF, or PDF format. If so, the preview picture text is extracted as the text for the embedding, representing the view of the embedding as it appears on the sheet, as opposed to an extraction of the full embedding contents.
2.2.12 Repeat steps 2.2.5-1.2.11 for each successive worksheet.
2.2.13 Append the external cell caches. These are caches of cell values from external files that are used within the current file.
2.2.14 Append the pivot caches. These are caches of values used in the pivot tables of the workbook.
3. PowerPoint® (97-2003)
3.1 General Information
3.1.1 The PowerPoint® 97-2003 format is a Structured Storage file with a main stream that represents the presentation and supplementary streams/storages for embeddings, pictures, etc.
3.1.2 All content in PowerPoint® documents is stored in "shapes." A shape can be a textbox, a drawing, or an embedding. An embedding preview picture is stored as a picture in the Pictures stream. The preview picture may be a metafile in WMF, PICT, or EMF format. If so, the preview picture text is extracted as the text for the embedding, representing the view of the embedding as it appears on the slide, as opposed to an extraction of the full embedding contents. Non-embedding pictures may also be stored as metafiles and likewise extracted.
3.2 Extraction Algorithm
3.2.1 Find the drawing information.
3.2.2 Find the slide footer information.
3.2.3 Find the notes header and footer information.
3.2.4 Find the notes slides.
3.2.5 Find and append non-default title master slide content.
3.2.6 Find and append non-default slide master slide content.
3.2.7 Find and append non-default notes master slide content.
3.2.8 Find the first slide.
3.2.9 Append the notes header for the slide.
3.2.10 Append the slide content. The content is appended in block order top-left to bottom-right to facilitate searching. The slide content includes inherited content from the master slide.
3.2.11 Append the slide footer for the slide.
3.2.12 Append the notes slide content for the slide.
3.2.13 Append the notes footer.
3.2.14 Append the comments for the slide.
3.2.15 Repeat steps 3.2.9-3.2.14 for each successive slide.
4. PowerPoint® (2007-2010)
4.1 General Information
4.1.1 The PowerPoint® 2007-2010 file format is a ZIP package with a main file that represents the presentation and supplementary files for each slide, slide master, embedding, etc.

4.1.2 All content in PowerPoint® documents is stored in "shapes." A shape can be a textbox, a drawing, or an embedding. An embedding preview picture is stored as a separate picture file in the ZIP package. The preview picture may be a metafile in WMF, PDF, or EMF format. If so, the preview picture text is extracted as the text for the embedding, representing the view of the embedding as it appears on the slide, as opposed to an extraction of the full embedding contents. Non-embedding pictures may also be stored as metafiles and likewise extracted.

4.2 Extraction Algorithm 4.2.1 Read the presentation. This tells us about the slides and other parts.

4.2.2 Read the slides.

4.2.3 Read the slide masters. This tells us about inherited content and layout.

4.2.4 Read the notes masters. This tells us about notes page inherited content and layout.

4.2.5 Read the comment authors information.

4.2.6 Read the slide layouts information. This tells us about inherited content and layout.

4.2.7 Find and append non-default slide master slide content.

4.2.8 Find and append non-default slide layout slide content.

4.2.9 Find and append non-default notes master slide content.

4.2.10 Find the first slide.

4.2.11 Append the notes header for the slide.

4.2.12 Append the slide content. The content is appended in block order top-left to bottom-right to facilitate searching. The slide content includes inherited content from the master slide and layout slide.

4.2.13 Append the slide footer for the slide.

4.2.14 Append the notes slide content for the slide.

4.2.15 Append the notes footer.

4.2.16 Append the comments for the slide.

4.2.17 Repeat steps 4.2.10-4.2.15 for each successive slide.

5. Word® (97-2003)

5.1 General Information 5.1.1 The Word® 97-2003 format is a Structured Storage file with a main stream that represents the document and supplementary streams/storages for pointer tables, embeddings, pictures, etc.

5.1.2 Content in a Word® document is stored as runs of textual content with placeholders for pictures, textboxes, embeddings, fields, and other objects. An embedding preview picture is stored as a picture in the Data stream. The preview picture may be a metafile in WMF, PICT, or EMF format. If so, the preview picture text is extracted as the text for the embedding, representing the view of the embedding as it appears on the page, as opposed to an extraction of the full embedding contents. Non-embedding pictures may also be stored as metafiles and likewise extracted.

5.1.3 Formatting runs are stored in parallel to the content. Formatting information is used to mark revisions and provide supplementary information about embeddings.

5.2 Extraction Algorithm 5.2.1 Get the main document text ranges.

5.2.2 Split the document text ranges by document section. Find the first section.

5.2.3 Find and append the header for the section of the document.

5.2.4 Append the section content.

5.2.5 Find and append the footer for the section of the document.

5.2.6 Repeat steps 5.2.3-5.2.5 for each successive section.

5.2.7 Find and append the footnote separators and footnotes for the document.

5.2.8 Find and append the endnote separators and endnotes for the document.

5.2.9 Find and append comments.

6. Word® (2007-2010)

6.1 General Information 6.1.1 The Word® 2007-2010 file format is a ZIP package with a main file that represents the main document body and supplementary files for headers, footers, embeddings, etc.

6.1.2 Content in a Word® document is stored as runs of textual content with placeholders for pictures, textboxes, embeddings, fields, and other objects. An embedding preview picture is stored as a separate picture file in the ZIP package. The preview picture may be a metafile in WMF, PDF, or EMF format. If so, the preview picture text is extracted as the text for the embedding, representing the view of the embedding as it appears on the page, as opposed to an extraction of the full embedding contents. Non-embedding pictures may also be stored as metafiles and likewise extracted.

6.1.3 Formatting runs are stored in-line with the content. Formatting information is used to mark revisions.

6.2 Extraction Algorithm 6.2.1 Read the comments.

6.2.2 Read the endnotes.

6.2.3 Read the footnotes.

6.2.4 Read the settings.

6.2.5 Read the comment authors information.

6.2.6 Read the headers and footers.

6.2.7 Append the header for the section of the document.

6.2.8 Append the section content.

6.2.9 Append the footer for the section of the document.

6.2.10 Repeat steps 6.2.7-6.2.9 for each successive section.

6.2.11 Append the footnote separators and footnotes for the document.

6.2.12 Append the endnote separators and endnotes for the document.

6.2.13 Append comments.

7. RTF 7.1 General Information 7.1.1 The RTF format is a plain text file with in-line markup, fields, and embeddings. An embedding preview picture is stored in-line with the embedding. The preview picture may be a metafile in WMF, PICT, or EMF format. If so, the preview picture text is extracted as the text for the embedding, representing the view of the embedding as it appears on the page, as opposed to an extraction of the full embedding contents. Non-embedding pictures may also be stored as metafiles and likewise extracted.

7.2 Extraction Algorithm 7.2.1 Parse the RTF into an intermediate structure to allow easy walking of nodes containing content or markup.

7.2.2 Split the document by document section. Find the first section 7.2.3 Find and append the header for the section of the document.

7.2.4 Append the section content.

7.2.5 Find and append the footer for the section of the document.

7.2.6 Repeat steps 7.2.3-7.2.5 for each successive section.

8. PST/MSG RTF Items 8.1 General Information 8.1.1 PST and MSG items can be plain text, HTML, or RTF. RTF items can contain in-line embeddings. An embedding preview picture is stored as a stream in the embedding (for Structured Storage-based embeddings). The preview picture may be a metafile in WMF or EMF format. If so, the preview picture text is extracted and reinserted into the RTF where the associated embedding placeholder is found. It is then extracted as the text for the embedding, representing the view of the embedding as it appears on the page, as opposed to an extraction of the full embedding contents.

8.2 Extraction Algorithm 8.2.1 Extract the RTF body from the PST or MSG item.

8.2.2 Parse the RTF into an intermediate structure to allow easy walking of nodes containing content or markup.

8.2.3 Insert the email (or other item type) header into the RTF. This is necessary because only the body is stored as RTF, but a full item includes a header added "on-the-fly" when displayed.

8.2.4 Find each embedding placeholder and insert the embedding preview picture into the RTF.

8.2.5 Perform full RTF text extraction as described in section 7.

Analysis of Sample Documents from Enron Litigation

Screening of Text in File "Hydro-Thermal.doc" using the Methods and Systems of the Present Invention. This document was made public during the bankruptcy and criminal/civil proceedings against Enron. The set of documents was collected and made available as a set by the EDRM association (http://www.edrm.org). FIG. 9 shows the in-line extracted text within a Microsoft® Word® document using the methods and systems of the present invention. As is evident, the visual representation of embedded text "Northwest Power Pool" is present in a linked or embedded object which is inserted between two paragraphs of text in the body of the Word® document. The methods of the present invention are able to replace the visual representation of this embedded text with a corresponding in-line text, and thus preserve the spatial relationship between the text of the embedded object and the surrounding text, utilizing an object map. Accordingly, the query or proximity search "heavy run-off months" within twenty words of "Northwest Power Pool", entered by a user as "(heavy run-off months) w/20 (Northwest Power Pool)" or any other acceptable format utilized in the art, performed on a source of electronic documents that include the "Hydro-Thermal.doc" file returns the file in response to the user query.

By way of comparison, FIG. 10 provides a representations of the same "Hydro-Thermal.doc" document as processed by a third-party software application, such as dtSearch® (www.dtsearch.com). The visual representation of the embedded object is not present where it was originally found in the document. As a result, any search using spatial relationships (proximity and phrase searches) which crosses the document and the object embedded therein does NOT result in a "hit" on a proximity search for the terms "heavy run-off months" and "Northwest Power Pool". Additionally, in a trial query employing dtSearch® and the same proximity search described above in connection with FIG. 9, dtSearch® did not return ANY data at all for this embedded object.

FIG. 11 provides another representation illustrating one result of a trial search employing the methods and systems of the present invention, which search used a proximity search across the documents and text embedded therein and returned seven (7) documents The scope of the present invention is not limited by what has been specifically shown and described hereinabove. Those skilled in the art will recognize that there are suitable alternatives to the depicted examples of materials, configurations, constructions and dimensions. Numerous references, including patents and various publications, are cited and discussed in the description of this invention. The citation and discussion of such references is provided merely to clarify the description of the present invention and is not an admission that any reference is prior art to the invention described herein. All references cited and discussed in this specification are incorporated herein by reference in their entirety. Variations, modifications and other implementations of what is described herein will occur to those of ordinary skill in the art without departing from the spirit and scope of the invention. While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation.

The invention claimed is:

1. A method of searching electronic documents, comprising, using one or more computer processors:
   (a) ripping data from each of a plurality of documents, wherein the ripped data includes text from a respective body of each document;
   (b) from the ripped data, detecting embedded objects in each document;
   (c) converting data from content within the detected embedded objects to text;
   (d) in a buffer, storing a representation of each document including: (1) the text of the respective body of each document and (2) the text obtained from conversion of the content of the detected embedded objects in the respective body of each document, wherein the storing includes storing the spatial relationship between (1) and (2) according to the original locations where the embedded objects appear in each of the respective bodies of the documents;
   (e) receiving search criteria including a plurality of search terms provided by a user and a proximity of the plurality of search terms; and
   (f) searching the stored information based on the search criteria and identifying a document that contains matching occurrences of at least a first of the search terms in text obtained from conversion of an embedded object in the document and at least a second of the search terms in text of the respective body of the document and having the proximity between the matching occurrences of at least the first of the search terms and the second of the search terms.

2. The method of claim 1, wherein at least one of the embedded objects contains visual information.

3. The method of claim 2, wherein the at least one of the embedded objects is an image.

4. The method of claim 3, wherein converting data from the image to text comprises optical character recognition (OCR).

5. The method of claim 1, wherein the step of converting data from the content of embedded objects to text comprises:
   identifying a portion of content of a respective embedded object that is viewable in a respective document when the respective document is viewed in a native format; and
   converting the viewable portion of the respective embedded object to text.

6. The method of claim 5 wherein the step of storing information comprises:
   storing the text of the respective document in the buffer;
   storing the text obtained from conversion of the viewable portion in the buffer; and storing a respective spatial relationship between the text of the respective document and the text obtained from conversion of the viewable portion of the respective embedded object.

7. The method of claim 5, wherein the text obtained from conversion of the viewable portion of the respective embedded object is stored in relation to one or more portions of the text of the respective document according to an original location where the respective embedded object appears in the respective documents.

8. The method of claim 7, wherein the step of storing information comprises:
 storing the text obtained from conversion of the viewable portion of the respective embedded object in-line between portions of the text of the respective document, whereby in-line storage preserves, in the buffer, a location of text that is present in the viewable portion relative to text of the respective document that surrounds the viewable portion.

9. The method of claim 7, wherein text obtained from conversion of only the viewable portion of the respective embedded object is stored in-line with the text of the respective document, and wherein the step of storing information further comprises:
 replacing, in the buffer, the viewable portion of the respective embedded object with the in-line text corresponding to the viewable portion.

10. The method of claim 5, wherein the step of storing information comprises:
 creating an object map representing the original locations where the embedded objects appear in each of the documents; and
 storing the object maps.

* * * * *